(12) United States Patent
Munjal et al.

(10) Patent No.: US 10,536,538 B2
(45) Date of Patent: Jan. 14, 2020

(54) SECURE DATA ERASURE VERIFICATION IN HYPERSCALE COMPUTING SYSTEMS

(71) Applicant: Microsoft Technology Licensing, LLC, Redmond, WA (US)

(72) Inventors: Ashish Munjal, Redmond, WA (US); Laura Caulfield, Woodinville, WA (US); Lee Progl, Carnation, WA (US); Uuganjargal Khanna, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 15/268,385

(22) Filed: Sep. 16, 2016

(65) Prior Publication Data

US 2018/0083854 A1 Mar. 22, 2018

(51) Int. Cl.
| | |
|---|---|
| *H04L 12/26* | (2006.01) |
| *H04L 29/06* | (2006.01) |
| *H04L 29/08* | (2006.01) |
| *G06F 21/78* | (2013.01) |

(52) U.S. Cl.
CPC .............. *H04L 67/18* (2013.01); *G06F 21/78* (2013.01); *G06F 2221/2101* (2013.01); *G06F 2221/2143* (2013.01)

(58) Field of Classification Search
CPC ..... H04L 67/10; H04L 67/1097; H04L 67/18; H04L 41/28; G06F 21/78; G06F 21/6209
See application file for complete search history.

(56) References Cited

U.S. PATENT DOCUMENTS

| | | |
|---|---|---|
| 7,216,207 B1 | 5/2007 | Armstrong-Crews et al. |
| 7,512,812 B2 | 3/2009 | Sohn |
| 8,387,127 B1 | 2/2013 | Narver et al. |
| 8,909,888 B2 | 12/2014 | Goss et al. |
| 8,938,624 B2 | 1/2015 | Obukhov et al. |
| 9,111,621 B2 | 8/2015 | Krutzik et al. |
| 9,141,303 B2 | 9/2015 | Kishi et al. |
| 9,152,505 B1 | 10/2015 | Brooker et al. |
| 9,213,594 B2 | 12/2015 | Strasser et al. |

(Continued)

OTHER PUBLICATIONS

Gutmann, Peter, "Secure Deletion of Data from Magnetic and Solid-State Memory", In Proceedings of the 6th conference on USENIX Security Symposium, Jul. 22, 1996, pp. 1-17.

(Continued)

*Primary Examiner* — Noura Zoubair
(74) *Attorney, Agent, or Firm* — Liang IP, PLLC

(57) ABSTRACT

Techniques of implementing out-of-band data erasure verification in computing systems are disclosed herein. In one embodiment, a method includes receiving a verification instruction from a system administrator. In response to and based on the received verification instruction, the method includes selecting a set of persistent storage devices to which data erasure verification is to be performed. The method also includes relaying the verification instruction to additional computing devices in additional enclosures, thereby causing data erasure verification on one or more additional persistent storage devices in the additional enclosures be performed generally in parallel to performing data erasure verification on the subset of persistent storage devices in one of the enclosures.

20 Claims, 14 Drawing Sheets

(56) References Cited

U.S. PATENT DOCUMENTS

| | | | |
|---|---|---|---|
| 2008/0172744 | A1 | 7/2008 | Schmidt et al. |
| 2010/0058077 | A1* | 3/2010 | Matsuda ............... G06F 21/78 |
| | | | 713/194 |
| 2011/0051277 | A1 | 3/2011 | Bradshaw |
| 2012/0278529 | A1* | 11/2012 | Hars ............... G06F 12/0246 |
| | | | 711/103 |
| 2014/0365743 | A1 | 12/2014 | Pronozuk et al. |
| 2015/0006911 | A1 | 1/2015 | Cochran et al. |
| 2015/0012623 | A1 | 1/2015 | Jubran et al. |
| 2015/0012982 | A1 | 1/2015 | Hohnke |
| 2015/0106562 | A1 | 4/2015 | Helmer |
| 2015/0121537 | A1 | 4/2015 | Ellis et al. |
| 2015/0309925 | A1* | 10/2015 | Casperson ............... G06F 1/24 |
| | | | 711/103 |
| 2016/0099061 | A1 | 4/2016 | Ziperovich |
| 2016/0274798 | A1* | 9/2016 | Dube ............... G06F 3/0658 |
| 2016/0353258 | A1* | 12/2016 | Stuntebeck ............ H04W 4/14 |
| 2017/0193232 | A1* | 7/2017 | Rabasco ............... G06F 21/60 |

OTHER PUBLICATIONS

"Out of Band Management Security Best Practices and Privacy Information", Published on: Jun. 5, 2011, Available at: https://technet.microsoft.com/en-us/library/cc161895.aspx.

"Fully Certified Data Erasure", Retrieved on: Jul. 15, 2016. Available at: http://www.mfg-uk.com/corporate/wp-content/uploads/sites/7/2014/09/Fully-certified-data-erasure.pdf.

"Secure Data Erasure from Software Defined Data Centers", Retrieved on: Jul. 15, 2016 Available at: http://www.blancco.com/wp-content/uploads/2016/06/product-one-pager-blancco-virtual.pdf.

Hughes, et al., "Tutorial on Disk Drive Data Sanitization", Published on: Sep. 2006, Available at: http://cmrr.ucsd.edu/people/Hughes/documents/DataSanitizationTutorial.pdf.

"Seagate Instant Secure Erase Deployment Options", In Seagate Technology Paper, Sep. 13, 2013, 5 pages.

"Secure Data Erasure", Retrieved on: Jul. 15, 2016 Available at: https://www.blancco.com/technology-solutions/secure-data-erasure/.

"EMC data erasure services", Published on: Sep. 7, 2012 Available at: https://www.emc.com/collateral/services/consulting/h1321-certified-data-erasure-serv-ss.pdf.

"Data Erasure Solutions", Published on: Jul. 5, 2016 Available at: https://www.krollontrack.com/products/data-erasure/.

Gutmann, Peter, "Secure Deletion of Data from Magnetic and Solid-State Memory", In Proceedings of the 6th conference on USENIX Security Symposium, Focusing on Applications of Cryptography, Jul. 22, 1996, 18 pages.

"Non Final Office Action Issued in U.S. Appl. No. 15/268,375", dated Oct. 30, 2018, 25 Pages.

"Final Office Action Issued in U.S. Appl. No. 15/268,375", dated Apr. 12, 2019, 31 Pages.

* cited by examiner

SECURE DATA ERASURE VERIFICATION IN HYPERSCALE COMPUTING SYSTEMS

BACKGROUND

Datacenters and other computing systems typically include routers, switches, bridges, and other physical network devices that interconnect a large number of servers, network storage devices, and other types of computing devices. The individual servers can host one or more virtual machines or other types of virtualized components. The virtual machines can execute applications when performing desired tasks to provide cloud computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud computing systems can include thousands, tens of thousands, or even millions of servers housed in racks, containers, or other enclosures. Each server can include, for example, a motherboard containing one or more processors or "cores," volatile memory (e.g., dynamic random access memory), persistent storage devices (e.g., hard disk drives, solid state drives, etc.), network interface cards, or other suitable hardware components. Such hardware components typically have useful lives beyond which reliability may not be expected or guaranteed. As such, the servers or hardware components may need to be replaced every four, five, six, or other suitable numbers of years.

One consideration of replacing expiring or expired hardware components is ensuring data security. Certain servers can contain multiple persistent storage devices containing data with various levels of business importance. One technique of ensuring data security involves overwriting persistent storage devices using custom software. For example, a technician can connect the servers or racks of servers to a custom computer having an application specifically designed to perform data erasure. Once connected, the technician can then erase all data from the persistent storage devices using the application.

One challenge of the foregoing data erasure operations is to efficiently audit and verify that data has been securely erased from the persistent storage devices before the servers can be decommissioned. One verification technique is to physically remove persistent storage devices from the servers and manually verify (e.g., via bit-by-bit analysis) that data has been securely erased from the removed persistent storage devices. Such a technique can be time consuming and thus costly. As such, typically only a small portion of the persistent storage devices are checked or audited in this manner. As a result, some persistent storage devices may still contain sensitive data even after performing the foregoing manual verification procedure on a small portion of the decommissioned persistent storage devices.

Several embodiments of the disclosed technology can address several aspects of the foregoing challenge by implementing in-band or out-of-band data erasure verification in hyperscale computing systems. In certain implementations, a computing system can include both a data network and an independent management network. The data network can be configured to allow communications related to performing data processing, network communications, or other suitable tasks in providing desired computing services to users. In contrast, a management network can be configured to perform management functions, example of which can include operation monitoring, power operations (e.g., power-up/down/cycle of servers), or other suitable operations. The management network can be separate and independent from the data network, for example, by utilizing separate wired and/or wireless communications media than the data network.

In certain implementations, an enclosure (e.g., a rack, a container, etc.) can include an enclosure controller (or multiple enclosure controllers) operatively coupled to multiple servers housed in the enclosure. During data erasure verification, an administrator can issue a verification instruction to the enclosure controller to perform data erasure verification on one or more servers in the enclosure via the management network out-of-band. In response, the enclosure controller can identify the one or more servers based on serial numbers, server locations, or other suitable identification parameters and identify a number of connected persistent storage devices to be verified.

The enclosure controller can then issue a verification command to each of the one or more servers connected to one or more persistent storage devices to be verified. In response, a baseboard management controller ("BMC") or other suitable components of the servers can enumerate a portion of or all persistent storage devices that the BMC is aware of to be on the server. The BMC can then command each of the persistent storage device to verify data contained thereon. In certain embodiments, erasure verification can involve reading data from at least a portion of a persistent storage device and determining whether a preset erasure pattern exists in the read data. The preset erasure pattern can include all zeros, all ones, or other suitable patterns. In other embodiments, erasure verification can also include determining an entropy of the read data and compare the determined entropy to a threshold. In further embodiments, erasure verification can also involve attempting to recover deleted data or files on the persistent storage device. If recovery is achieved, then the persistent storage device is not properly erased. The BMCs can also report results of the erasure verification to the enclosure controller, which in turn aggregate and reports the verification results to the administrator via the management network.

The administrator can also configure certain verification parameters or indices based on, for example, a level of business importance (e.g., high, medium, or low) or other suitable criteria. In certain embodiments, the verification parameters can include a percentage of persistent storage devices, a percentage of capacity on individual persistent storage devices, and a percentage of logic data locks to be audited during verification. For example, the administrator can specify that the verification is to be performed on 50% of persistent storage devices in, for instance, a rack of servers that have persistent storage devices designated as containing data of a certain level of business importance. The administrator can also specify that 75% of a total capacity of the 50% of the persistent storage devices is to be checked, and, for each checked persistent storage device, 100% of the logic data blocks is to be checked.

The administrator can also adjust or "tune" one or more of the foregoing percentages based on, for instance, levels of business importance, previous verification results, or other suitable parameters. For example, the administrator can specify that for persistent storage devices containing data of high business importance, the verification can be performed on 75% of persistent storage devices, 80% of total capacity on each persistent storage device, and 70% of logic data blocks on the audited capacity in each persistent storage device. For persistent storage devices containing data of low business importance, the foregoing percentages may be lowered to 10%, 30%, and 10%, respectively.

In other implementations, the enclosure controller can be an originating enclosure controller configured to propagate or distribute the received verification instruction to additional enclosure controllers in the same or other enclosures via the management network. In turn, the additional enclosure controllers can instruct corresponding BMC(s) to perform secure data erasure verification and report verification result to the originating enclosure controller. The originating enclosure controller can then aggregate and report the verification results to the administrator via the management network. In further implementations, the administrator can separately issue a verification instruction to each of the enclosure controllers instead of utilizing the originating enclosure controller. In yet further implementations, the administrator can also issue the verification instruction directly to the individual servers via the data network according to a suitable in-band communications protocol. In yet other implementations, the foregoing operations can be performed by a datacenter controller, a fabric controller, or other suitable types of controller via the management network in lieu of the enclosure controller.

Several embodiments of the disclosed technology can efficiently and cost-effectively perform verification of secure data erasure on multiple servers in hyperscale computing systems having thousands, tens of thousands, or even millions of servers. Relaying the verification instructions via the enclosure controllers can allow verification of secure data erasure of multiple servers, racks of servers, or clusters of servers in parallel, staggered, or in other suitable manners. Also, the foregoing secure data erasure verification technique generally does not involve manual intervention by technicians. As such, several embodiments of the disclosed technology can be efficient and cost effective to be applicable to a large number of persistent storage devices.

DETAILED DESCRIPTION

Figure 1:
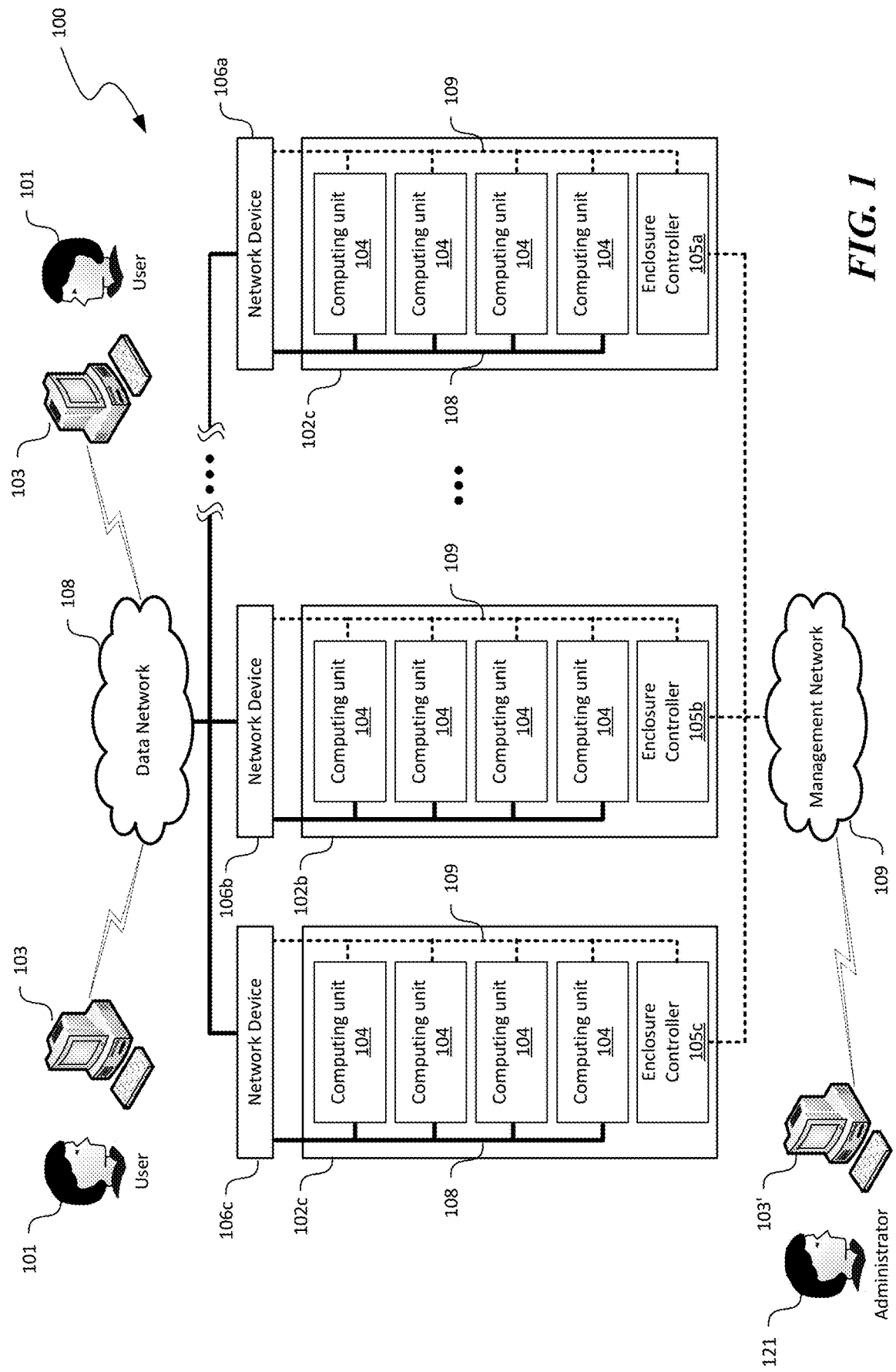
FIG. 1 is a schematic diagram illustrating a computing system implemented with efficient data erasure verification in accordance with embodiments of the disclosed technology.

Certain embodiments of systems, devices, components, modules, routines, data structures, and processes for implementing data erasure verification in hyperscale computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-9.

As used herein, the term a "computing system" generally refers to an interconnected computer network having a plurality of network nodes that connect a plurality of servers or computing units to one another or to external networks (e.g., the Internet). The term "network node" generally refers to a physical network device. Example network nodes include routers, switches, hubs, bridges, load balancers, security gateways, or firewalls. A "computing unit" generally refers to a computing device configured to implement, for instance, one or more virtual machines or other suitable network-accessible services. For example, a computing unit can include a server having a hypervisor configured to support one or more virtual machines or other suitable types of virtual components. In another example, a computing unit can also include a network storage server having ten, twenty, thirty, forty, or other suitable number of persistent storage devices thereon.

The term a "data network" generally refers to a computer network that interconnects multiple computing units to one another in a computing system and to an external network (e.g., the Internet). The data network allows communications among the computing units and between a computing unit and one or more client devices for providing suitable network-accessible services to users. For example, in certain embodiments, the data network can include a computer network interconnecting the computing units with client devices operating according to the TCP/IP protocol. In other embodiments, the data network can include other suitable types of computer network.

In contrast, the term "management network" generally refers to a computer network for communicating with and controlling device operations of computing units independent of execution of any firmware (e.g., BIOS) or operating system of the computing units. The management network is independent from the data network by employing, for example, separate wired and/or wireless communications media. A system administrator can monitor operating status of various computing units by receiving messages from the computing units via the management network in an out-of-band fashion. The messages can include current and/or historical operating conditions or other suitable information associated with the computing units. The system administrator can also issue instructions to the computing units to cause the computing units to power up, power down, reset, power cycle, refresh, and/or perform other suitable operations in the absence of any operating systems on the computing units. Communications via the management network are referred to herein as "out-of-band" communications while communications via the data network are referred to as "in-band" communications.

Also used herein, the terms "secure data erasure," "data erasure," "data clearing," or "data wiping," all generally refer to a software-based operation of overwriting data on a persistent storage device that aims to completely destroy all electronic data residing on the persistent storage device. Secure data erasure typically goes beyond basic file deletion, which only removes direct pointers to certain disk sectors and thus allowing data recovery. Unlike degaussing or physical destruction, which can render a storage media unusable, secure data erasure can remove all data from a persistent storage device while leaving the persistent storage device operable, and thus preserving IT assets, and reducing landfill wastes. The term "persistent storage device" generally refers to a non-volatile computer memory that can retain stored data even without power. Examples of persistent storage device can include read-only memory ("ROM"), flash memory (e.g., NAND or NOR solid state drives or SSDs), and magnetic storage devices (e.g. hard disk drives or HDDs).

Further used herein, the terms "data erasure verification" or "data erasure audit" generally refer to a process to confirm that all electronic data residing on a persistent storage device has been erased. Data erasure verification can be performed in various ways. In certain embodiments, data erasure verification can include reading data from certain logic blocks (e.g., a boot sector) and verify that the logic blocks have been overwritten with certain data. In other embodiments, data erasure verification can also include determining whether the read data has certain data patterns (e.g., all zeros or ones). In further embodiments, data erasure verification can also include determining an entropy of the read data reportedly subject to cryptographic erasure. The determined entropy can then be compared with a threshold to determine whether an original cryptographic key has been removed to render the read data incomprehensible. In yet further embodiments, data erasure verification can be performed according to other suitable techniques in order to validate secure data erasure applied to persistent storage devices.

Maintaining datacenters or other computing systems can involve replacing servers, hard disk drives, or other hardware components periodically. One consideration of replacing expiring or expired hardware components is ensuring data security. Often, servers can contain data with various levels of business importance. Leaking such data can cause breach of privacy, confidentiality, or other undesirable consequences. As such, before the expiring or expired hardware components are decommissioned, secure data erasure is typically performed by, for example, overwriting the persistent storage devices to remove existing data. However, verification of such secure data erasure can be time consuming and costly.

Several embodiments of the disclosed technology can address several aspects of the foregoing challenge by implementing generally concurrent data erasure verification in hyperscale computing systems. In certain embodiments, an administrator can issue a verification instruction to a rack controller, a chassis manager, or other suitable types of enclosure controller to initiate data erasure verification on one or more servers in the enclosure. In response, the enclosure controller can identify the one or more servers and command initiation of data erasure verification on one or more persistent storage devices attached to servers. The enclosure controller can also relay the verification instruction to additional enclosure controllers in the same or different enclosure(s) such that data erasure verification can be performed in a parallel, staggered, overlapping, or other suitable manners in the computing system. As such, data erasure verification can be performed efficiently and conveniently generally without involving manual intervention by technicians, as described in more detail below with reference to FIGS. 1-9.

FIG. 1 is a schematic block diagram illustrating a computing system 100 having computing units 104 configured in accordance with embodiments of the disclosed technology. As shown in FIG. 1, the computing system 100 can include multiple computer enclosures 102 (identified as first, second, and third enclosure 102a, 102b, and 102c, respectively) individually housing computing units 104 interconnected by a data network 108 via network devices 106 (identified as first, second, and third network device 106a, 106b, and 106c, respectively). The data network 108 can also be configured to interconnect the individual computing units 104 with one or more client devices 103. Even though particular configurations of the computing system 100 are shown in FIG. 1, in other embodiments, the computing system 100 can also include additional and/or different components than those shown in FIG. 1.

The computer enclosures 102 can include structures with suitable shapes and sizes to house the computing units 104. For example, the computer enclosures 102 can include racks, drawers, containers, cabinets, and/or other suitable assemblies. In the illustrated embodiment of FIG. 1, four computing units 104 are shown in each computer enclosure 102 for illustration purposes. In other embodiments, individual computer enclosures 102 can also include twelve, twenty four, thirty six, forty eight, or any other suitable number of computing units 104. Though not shown in FIG. 1, in further embodiments, the individual computer enclosures 102 can also include power distribution units, fans, intercoolers, and/or other suitable electrical and/or mechanical components.

The computing units 104 can individually include one or more servers, network storage devices, network communications devices, or other suitable computing devices suitable for datacenters or other computing facilities. In certain embodiments, the computing units 104 can be configured to implement one or more cloud computing applications and/or services accessible by users 101 via the client device 103 (e.g., a desktop computer, a smartphone, etc.) via the data network 108. The computing units 104 can be individually configured to implement out-of-band secure data erasure in accordance with embodiments of the disclosed technology, as described in more detail below with reference to FIGS. 2A-3B.

As shown in FIG. 1, the individual computer enclosures 102 can also include an enclosure controller 105 (identified as first, second, and third enclosure controller 105a, 105b, and 105c, respectively) configured to monitor and/or control a device operation of the computing units 104, power distribution units, fans, intercoolers, and/or other suitable electrical and/or mechanical components. For example, the enclosure controllers 105 can be configured to power up, power down, reset, power cycle, refresh, and/or perform other suitable device operations on a particular computing unit 104 in a computer enclosure 102. In certain embodiments, the individual enclosure controllers 105 can include a rack controller configured to monitor operational status of the computing units 104 housed in a rack. One suitable rack controller is the Smart Rack Controller (EMX) provided by Raritan of Somerset, N.J. In other embodiments, the individual enclosure controllers 105 can include a chassis manager, a cabinet controller, a container controller, or other suitable types of controller. Though only one enclosure controller 105 is shown in each enclosure 102, in further embodiments, multiple enclosure controllers 105 (not shown) can reside in a single enclosure 102.

In the illustrated embodiment, the enclosure controllers 105 individually include a standalone server or other suitable types of computing device located in a corresponding computer enclosure 102. In other embodiments, the enclosure controllers 105 can include a service of an operating system or application running on one or more of the computing units 104 in the individual computer enclosures 102. In further embodiments, the in the individual computer enclosures 102 can also include remote server coupled to the computing units 104 via an external network (not shown) and/or the data network 108.

In certain embodiments, the data network 108 can include twisted pair, coaxial, untwisted pair, optic fiber, and/or other suitable hardwire communication media, routers, switches, and/or other suitable network devices. In other embodiments, the data network 108 can also include a wireless communication medium. In further embodiments, the data network 108 can include a combination of hardwire and wireless communication media. The data network 108 can operate according to Ethernet, token ring, asynchronous transfer mode, and/or other suitable link layer protocols. In the illustrated embodiment, the computing units 104 in the individual computer enclosure 102 are coupled to the data network 108 via the network devices 106 (e.g., a top-of-rack switch) individually associated with one of the computer enclosures 102. In other embodiments, the data network 108 may include other suitable topologies, devices, components, and/or arrangements.

As shown in FIG. 1, a management network 109 can also interconnect the computing units 104 in the computer enclosures 102, the enclosure controller 105, the network devices 106, and the management station 103'. The management network 109 can be independent from the data network 108. As used herein, the term "independent" in the context of networks generally refers to that operation of one network is not contingent on an operating condition of another network. As a result, the data network 108 and the management network 109 can operate irrespective of an operating condition of the other. In certain embodiments, the management station 103' can include a desktop computer. In other embodiments, the management station 103' can include a laptop computer, a tablet computer, or other suitable types of computing device via which an administrator 121 can access the management network 109.

In certain embodiments, the management network 109 can include twisted pair, coaxial, untwisted pair, optic fiber, and/or other suitable hardwire communication media, routers, switches, and/or other suitable network devices separate from those associated with the data network 108. In other embodiments, the management network 109 can also utilize terrestrial microwave, communication satellites, cellular systems, WI-FI, wireless LANs, Bluetooth, infrared, near field communication, ultra-wide band, free space optics, and/or other suitable types of wireless media. The management network 109 can also operate according to a protocol similar to or different from that of the data network 108. For example, the management network 109 can operate according to Simple Network Management Protocol ("SNMP"), Common Management Information Protocol ("CMIP"), or other suitable management protocols. In another example, the management network 109 can operate according to TCP/IP or other suitable network protocols. In the illustrated embodiment, the computing units 104 in the computer enclosures 102 are individually coupled (as shown with the phantom lines) to the corresponding enclosure controller 105 via the management network 109. In other embodiments, the computing units 104 may be coupled to the management network 109 in groups and/or may have other suitable network topologies.

In operation, the computing units 104 can receive requests from the users 101 using the client device 103 via the data network 108. For example, the user 101 can request a web search using the client device 103. After receiving the request, one or more of the computing units 104 can perform the requested web search and generate search results. The computing units 104 can then transmit the generated search results as network data to the client devices 103 via the data network 108 and/or other external networks (e.g., the Internet, not shown).

Independent from the foregoing operations, the administrator 121 can monitor operations of the network devices 106, the computing units 104, or other components in the computing system 101 via the management network 109. For example, the administrator 121 can monitor a network traffic condition (e.g., bandwidth utilization, congestion, etc.) through one or more of the network devices 106. The administrator 121 can also monitor for a high temperature condition, power event, or other status of the individual computing units 104. The administrator 121 can also turn on/off one or more of the computing devices 106 and/or computing units 104. As described in more detail below with reference to FIGS. 2A-3D, the computing system 100 can be implemented with concurrent data erasure verification via the data network 108 or the management network 109 in accordance with embodiments of the disclosed technology.

FIGS. 2A-2D are schematic diagrams illustrating the computing system 100 of FIG. 1 during certain stages of performing data erasure verification in an out-of-band manner via the management network 109 in accordance with embodiments of the disclosed technology. In FIGS. 2A-2D, certain components of the computing system 100 may be omitted for clarity. Also, in FIG. 2A-2D and other figures herein, similar reference numbers designate similar components in structure and function.

Figure 2A:
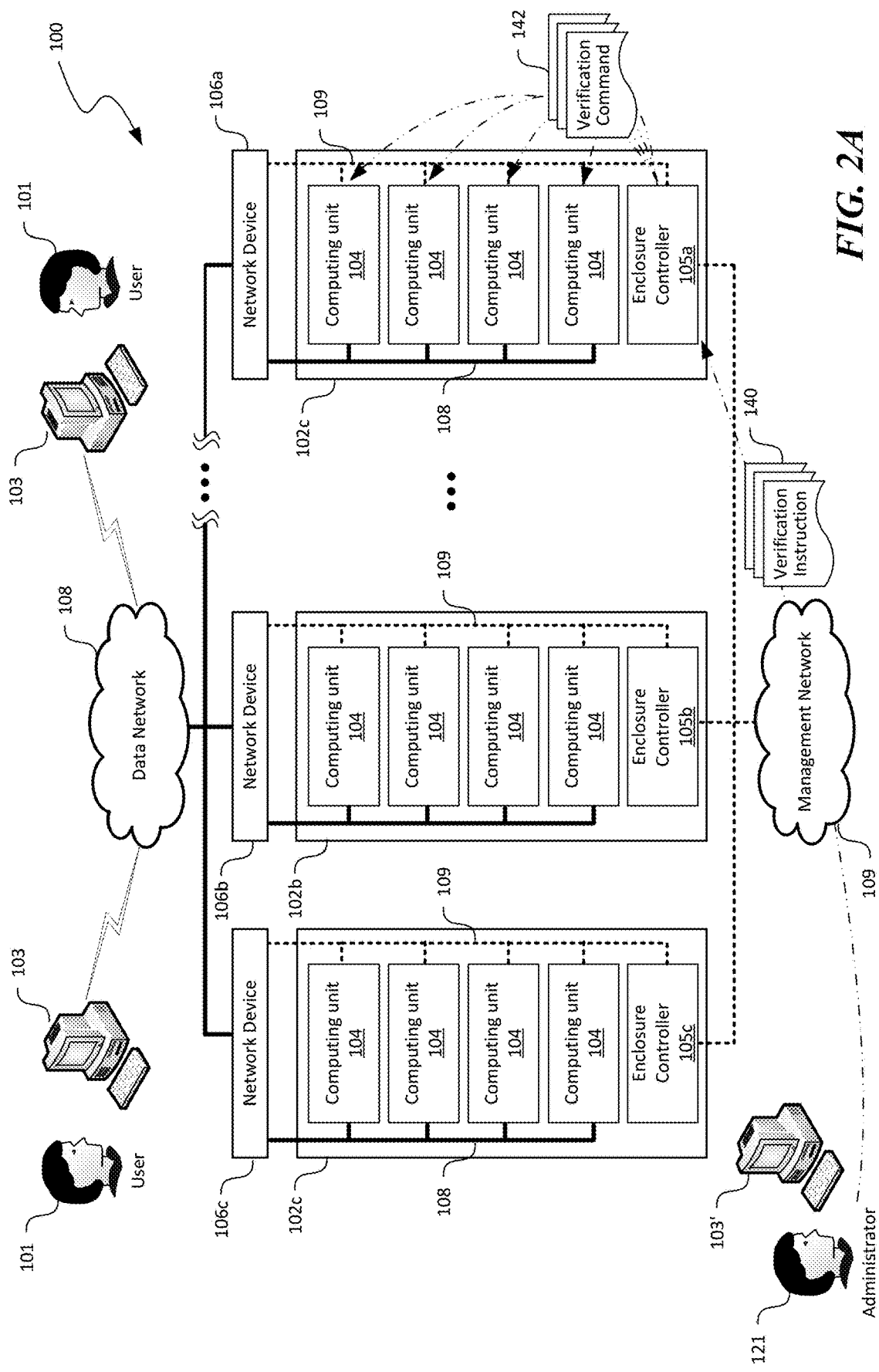
FIGS. 2A-2F are schematic diagrams illustrating the computing system of FIG. 1 during certain stages of performing data erasure verification in accordance with embodiments of the disclosed technology.

FIG. 2A illustrate an initial stage of performing data erasure verification in the first computer enclosure 102a in the computing system 100. As shown in FIG. 2A, an administrator 121 can determine that data erasure verification of persistent storage devices 124 (shown in FIGS. 3A-3C) attached to individual computing units 104 in the first computer enclosure 102a is due. In response, the administrator 121, with proper authentication and confirmation, can issue a verification instruction 140 to the first enclosure controller 105a. In certain embodiments, the verification instruction 140 can include a list of one or more computing units 104 in the first computer enclosure 102a to which data erasure verification is to be performed. The one or more computing units 104 can be identified by a serial number, a physical location, a network address, a media access control address ("MAC" address) or other suitable identifications. In other embodiments, the verification instruction 140 can include a command to verify all computing units 104 in the first computer enclosure 102a.

In further embodiments, the verification instruction 140 can also specify certain verification parameters or indices for performing data erasure verification. In certain embodiments, the verification parameters can include a percentage of persistent storage devices 124, a percentage of capacity on individual persistent storage devices 124, and a percentage of logic data locks to be audited during verification. For example, the administrator 121 can specify that verification is to be performed on 50% of persistent storage devices 124 in, for instance, all computing units 104 in the first computer enclosure 102a. As such, if the first computer enclosure 102a contains ten persistent storage devices 124, five would be subject to data erasure verification. The administrator 121 can also specify that 75% of a total capacity of the 50% of the persistent storage devices 124 is to be checked. Thus, if a persistent storage device 124 has a total capacity of 100 gigabytes, then 50 gigabytes on the persistent storage device 124 would be audited. And, the administrator 121 can also specify in the verification instruction 140 that for each audited persistent storage device 124, 80% of the logic data blocks is to be checked. Thus, in the example above, 80% of logic data blocks of 50 gigabytes on five persistent storage devices 124 would be subject to data erasure verification.

In further embodiments, the administrator can also adjust or "tune" one or more of the foregoing percentages based on, for instance, levels of business importance (e.g., high, medium, or low) of data residing on the persistent storage devices 124, previous verification results, or other suitable parameters. For example, the administrator 121 can specify that for persistent storage devices 124 containing data of high business importance ("HBI"), the data erasure verification is to be performed on 75% of persistent storage devices 124, 80% of total capacity on each persistent storage device 124, and 70% of logic data blocks on the audited capacity in each persistent storage device 124. In contrast, for persistent storage devices containing data of medium business importance ("MBI"), the foregoing percentages may be lowered to 50%, 50%, and 50%, respectively. For persistent storage devices containing data of low business importance ("LBI"), the foregoing percentages may be lowered to 30%, 35%, and 25%, respectively.

In response to receiving the verification instruction 140, the first enclosure controller 105a can identify the one or more of the persistent storage devices 124 and/or computing units 104 to perform data erasure verification. In certain embodiments, the first enclosure controller 105a can also request confirmation and/or authentication from the administrator 121 before initiating data erasure verification. For example, the enclosure controller 105a can request the administrator 121 to provide a secret code, password, or other suitable credential before proceeding with the data erasure verification.

Upon proper authentication and/or confirmation, the first enclosure controller 105a can enumerate or identify all persistent storage devices 124 attached or connected to the computing units 104 in the first computer enclosure 102a. In one embodiment, such enumeration can be include querying the individual computing units 104 via, for instance, an Intelligent Platform Management Interface ("IPMI") with the computing units 104 and/or persistent storage devices 124 connected thereto. In other embodiments, such enumeration can also include retrieving records of previously detected persistent storage devices 124 from a database (not shown), or via other suitable techniques.

Once the first enclosure controller 105a identifies the list of connected persistent storage devices 124, the first enclosure controller 105a can generate a list of the persistent storage devices 124 to be audited based on one or more verification parameters included in the verification instruction 140. The first enclosure controller 105a can then transmit verification commands 142 to one or more of the computing units 104 via the same IPMI or other suitable interfaces via a system management bus ("SMBus"), an RS-232 serial channel, an Intelligent Platform Management Bus ("IPMB"), or other suitable connections with the individual computing units 104. In response to the verification commands 142, the individual computing units 104 can perform suitable data erasure verification, as described in more detail below with reference to FIGS. 3A-3B. In one embodiment, the computing units 104 can perform data erasure verification generally in parallel. As such, data erasure verification can be performed on more than one computing units 104 at the same time. In other embodiments, data erasure verification can be performed in staggered, overlapped, or other suitable manners.

Figure 2B:
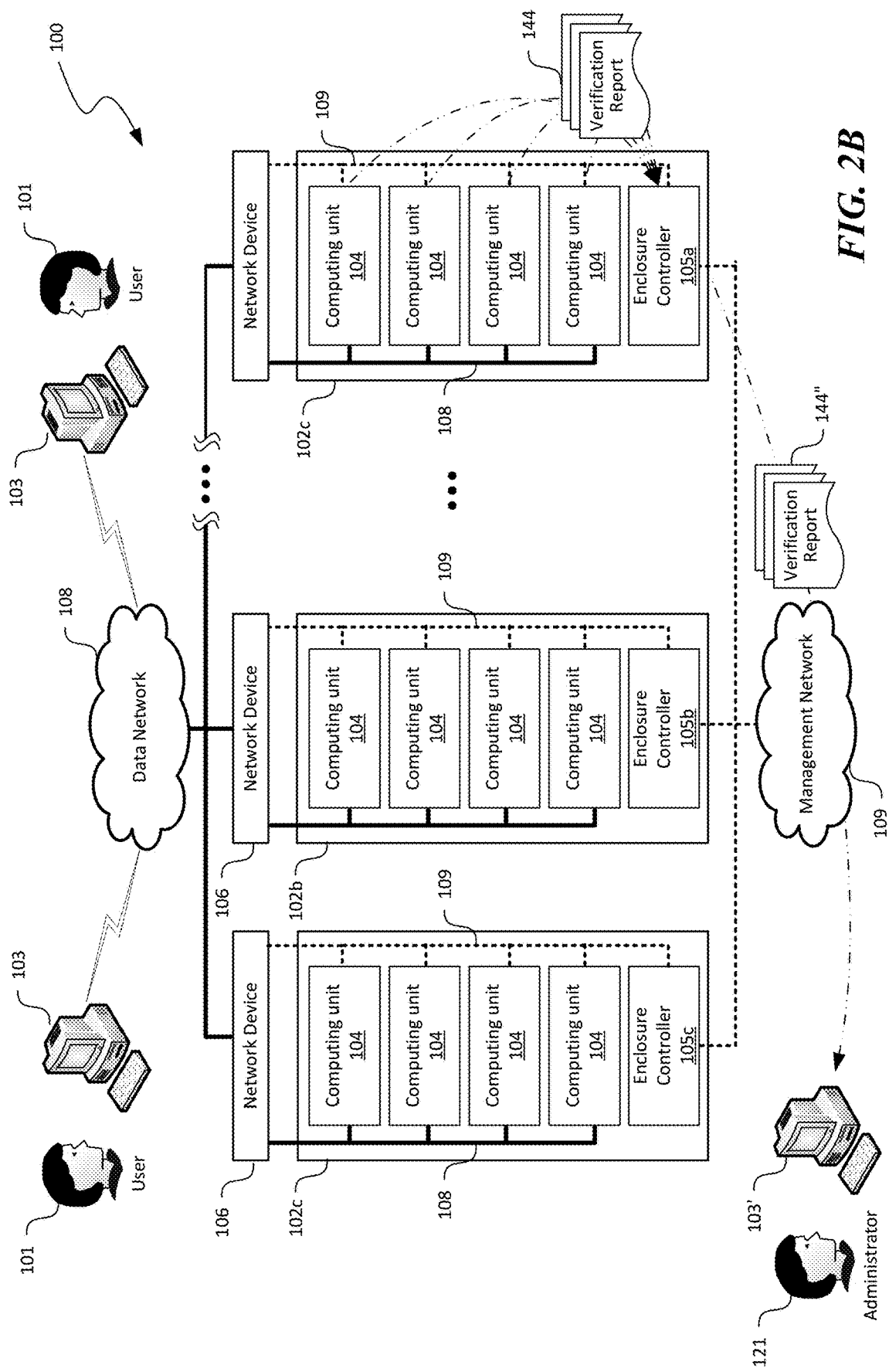

As shown in FIG. 2B, once data erasure verification is completed, the individual computing units 104 can transmit verification report 144 to the first enclosure controller 105a via the same IPMI or other suitable interfaces. In certain embodiments, the verification report 144 can include data indicating a failure (i.e., data at least not completely erased), a successful completion, or a non-performance (e.g., drive not readable) of the requested data erasure verification on one or more persistent storage devices 124. In other embodiments, the verification report 144 can also include a percentage of audited data that has been erased or not erased on a particular persistent storage device 124. In further embodiments, the verification report 144 can also include data indicating a start time, an elapsed period, a complete time, an error code, an associated secure data erasure technique applied, a make/model of the persistent storage devices 124, or other suitable information related to the data erasure verification performed on one or more persistent storage devices 124. The first enclosure controller 105a can then aggregate the received verification report 144 from the individual computing units 104 and transmit an aggregated verification report 144' to the administrator 121 via the management network 109. Based on the received aggregated verification report 144', the administrator 121 can then identify one or more of the computing units 104 and/or persistent storage devices 124 for manual inspection, performing additional audit, or other suitable operations.

Figure 2C:
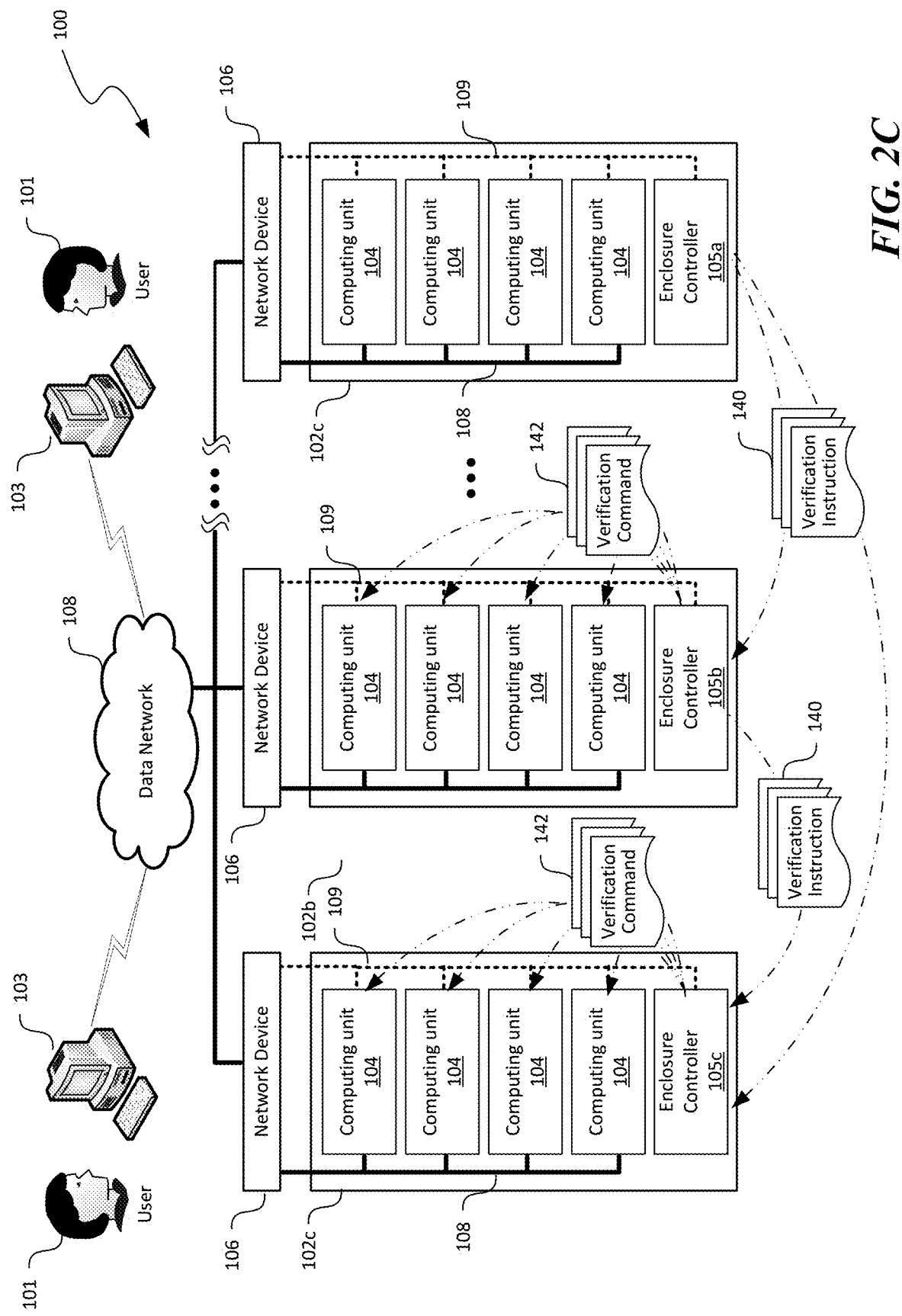

Even though FIGS. 2A and 2B illustrate operations of performing data erasure verification on computing units 104 in a single computer enclosure 105, in other embodiments, data erasure verification can also be performed on computing units 104 in different computer enclosures 105 in generally a parallel manner. For example, as shown in FIG. 2C, in certain embodiments, the verification instruction 140 can also identify one or more computing units 104 in one or more other computer enclosures 102 to perform data erasure verification.

In response, the first enclosure controller 105a can identify one or more other enclosure controller 105 for relaying the verification instruction 140. For example, in the illustrated embodiment, the first enclosure controller 105 can identify both the second and third enclosure controllers 105b and 105c based on the received verification instruction 140. As such, the first enclosure controller 105a can relay the verification instruction 140 to both the second and third enclosure controllers 105b and 105c. In turn, the second and third enclosure controllers 105b and 105c can be configured to enumerate connected persistent storage devices 124 and issue verification commands 142 generally similarly to the operations described above with reference to the first enclosure controller 105a. In other embodiments, the verification instruction 140 can be relayed in a daisy chain. For instance, as shown in FIG. 2C, instead of transmitting the verification instruction 140 from the first enclosure controller 105a, the second enclosure controller 105b can relay the verification instruction 140 to the third enclosure controller 105c. In further embodiments, the administrator 121 can issue erasure instructions 140 to all first, second, and third enclosure controllers 105 individually.

Figure 2D:
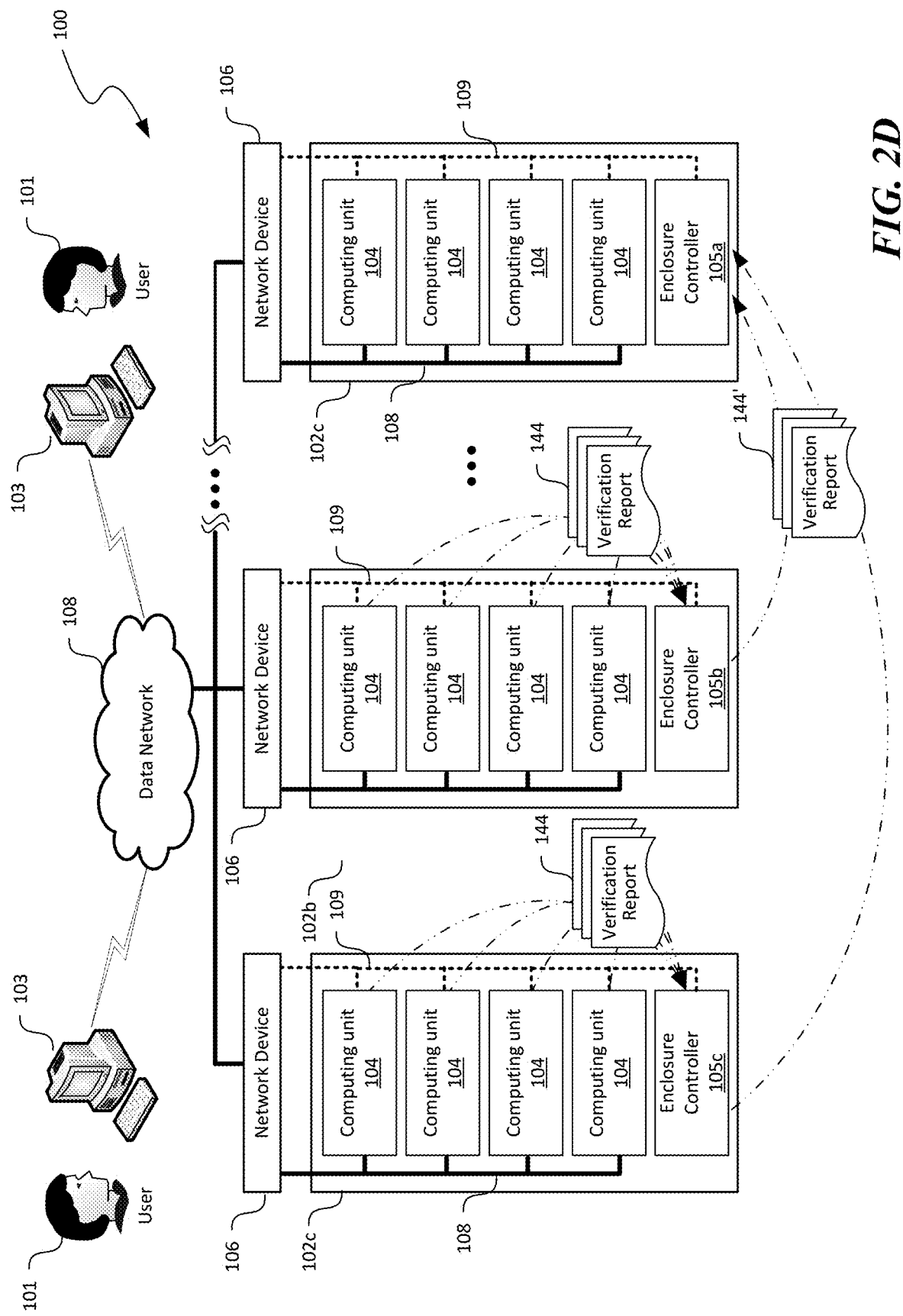

As shown in FIG. 2D, once data erasure verification is completed, the individual computing units 104 in the second and third computer enclosures 102b and 102c can transmit verification report 144 to the second and third enclosure controllers 105b and 105c, respectively. The second and third enclosure controllers 105b and 105c can in turn aggregate the verification reports 144 and transmit the aggregated verification reports 144' to the first enclosure controller 105a. The first enclosure controller 105a can then aggregate all received verification reports 144 and transmit the aggregated verification report 144' to the administrator 121, as described above with reference to FIG. 2B.

Several embodiments of the disclosed technology can thus efficiently and cost-effectively perform data erasure verification on multiple computing units 104 in the computing system 100. For example, relaying the erasure instructions 140 via the enclosure controllers 105 can allow performance of data erasure verification of multiple computing units 104, racks of computing units 104, or clusters of computing units 104 in a parallel, staggered, concurrent, or in other suitable manners. Also, the foregoing data erasure verification technique generally does not involve manual intervention by technicians or the administrator 121. As such, several embodiments of the disclosed data erasure verification can be efficient and cost effective.

Figure 2E:
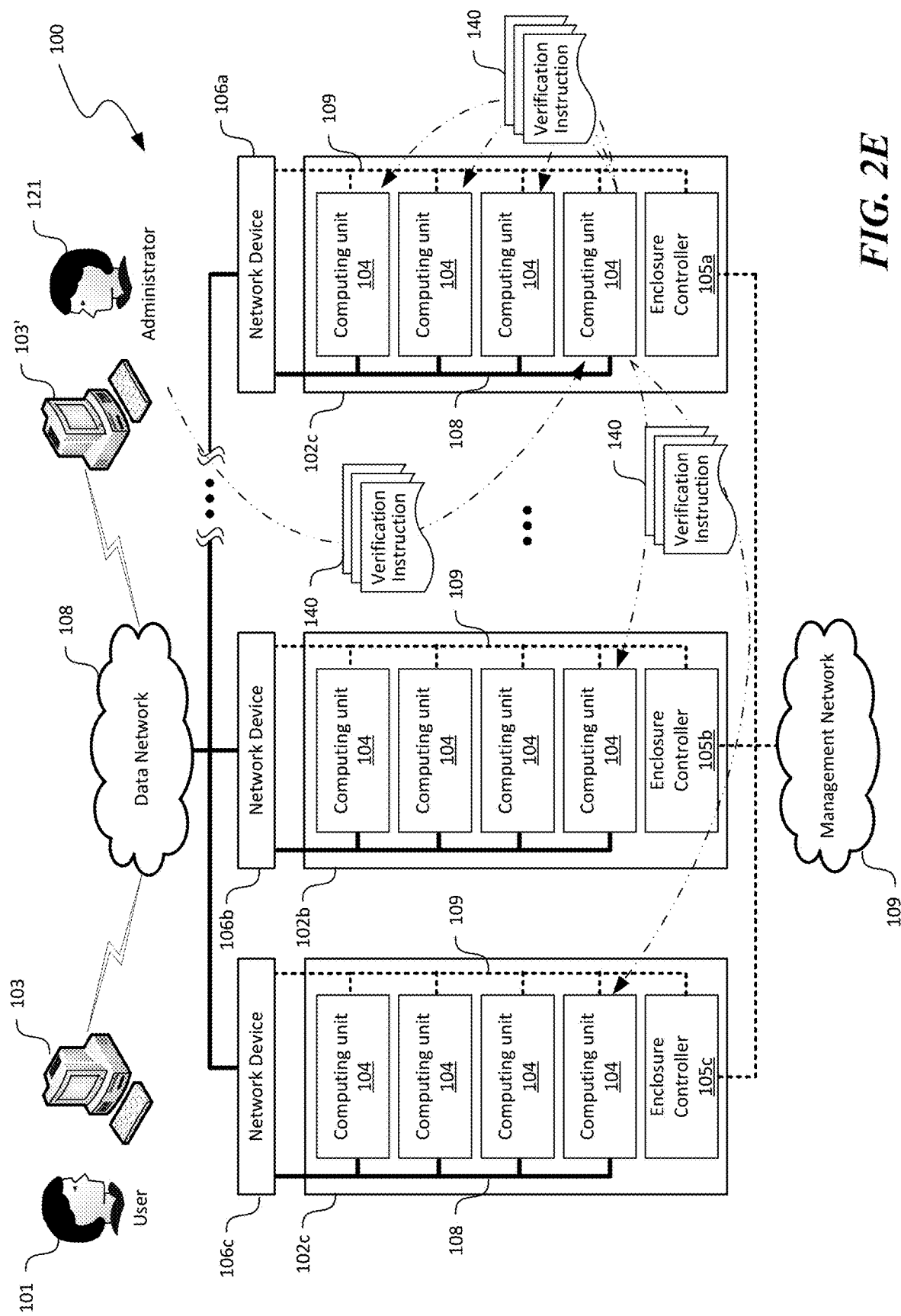

Even though the foregoing data erasure verification technique is described using an out-of-band communications channel (e.g., via the management network), in other embodiments, the foregoing data erasure verification technique can also be performed using an in-band communications channel. For example, as shown in FIG. 2E, the administrator 121 can issue a verification instruction 140 directly to one of the computing unit 104 for initiating a data erasure verification process on the computing unit 104 via the data network 108. The computing unit 104 can also relay the verification instruction 140 to other computing units in the same computer enclosure 102 or in different computer enclosures 102. In other examples, the administrator 121 can issue separate verification instructions 140 (not shown) to individual computing units 104 in the same or different computer enclosures 102 for initiating a data erasure verification process.

Figure 2F:
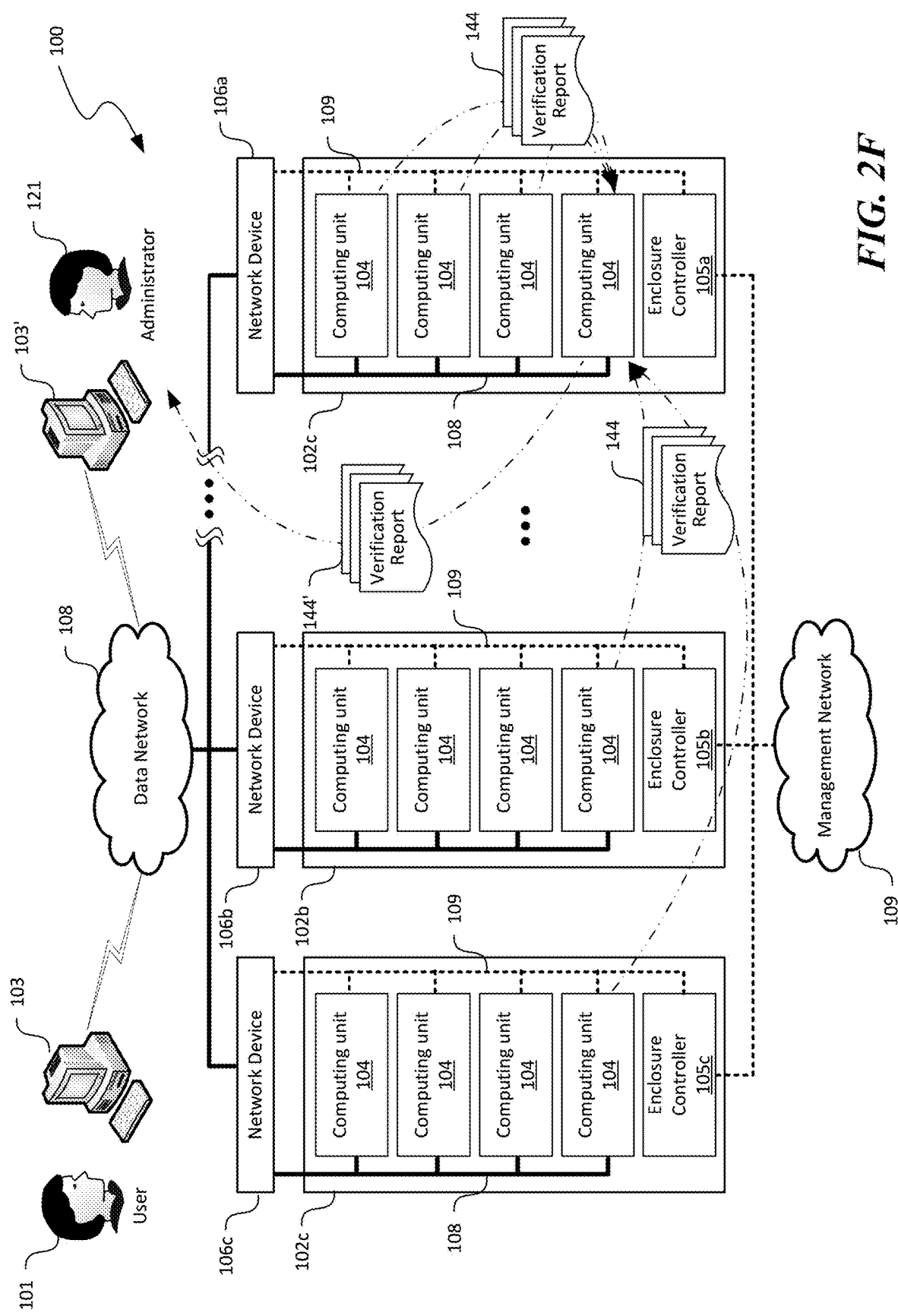

As shown in FIG. 2F, once data erasure verification is completed, the individual computing units 104 in the second and third computer enclosures 102b and 102c can transmit verification report 144 to the computing unit 104 in the first computer enclosure 102a. The computing unit 104 can in turn aggregate the verification reports 144 and transmit the aggregated verification reports 144' to the administrator 121 via the data network 108. In further embodiments, the administrator 121 can also issue the verification instruction 140 to the enclosure controllers 105 via the data network 108. Based on the received verification instruction 140, the individual enclosure controllers 105 can initiate the data erasure verification on respective computing units 104 and generate verification reports 144 as described above with reference to FIGS. 2A-2B.

Figure 3A:
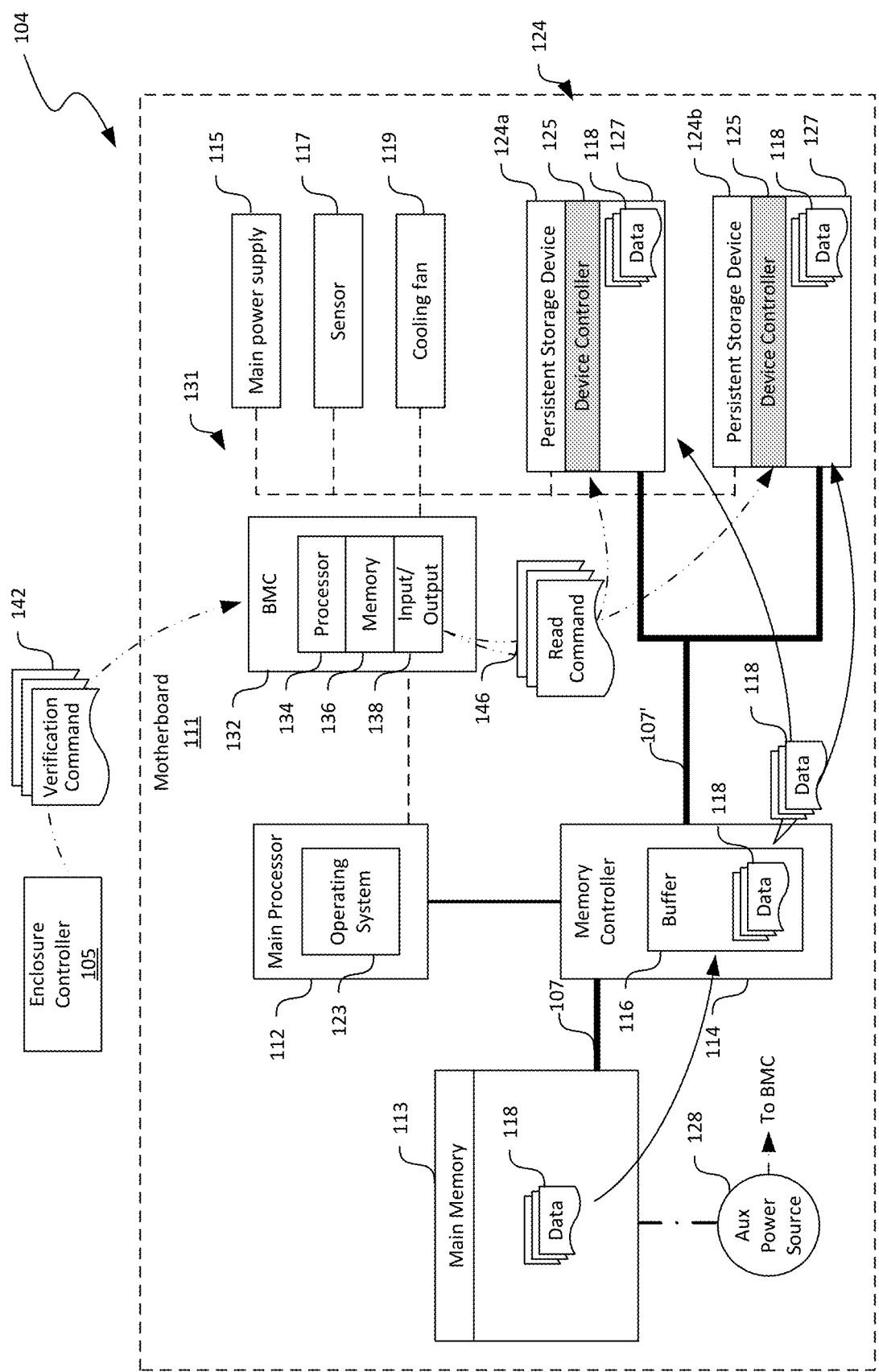
FIGS. 3A-3B are block diagrams illustrating certain hardware/software components of a computing unit suitable for the computing system of FIG. 1 during certain stages of data erasure verification in accordance with embodiments of the disclosed technology.
Figure 3B:
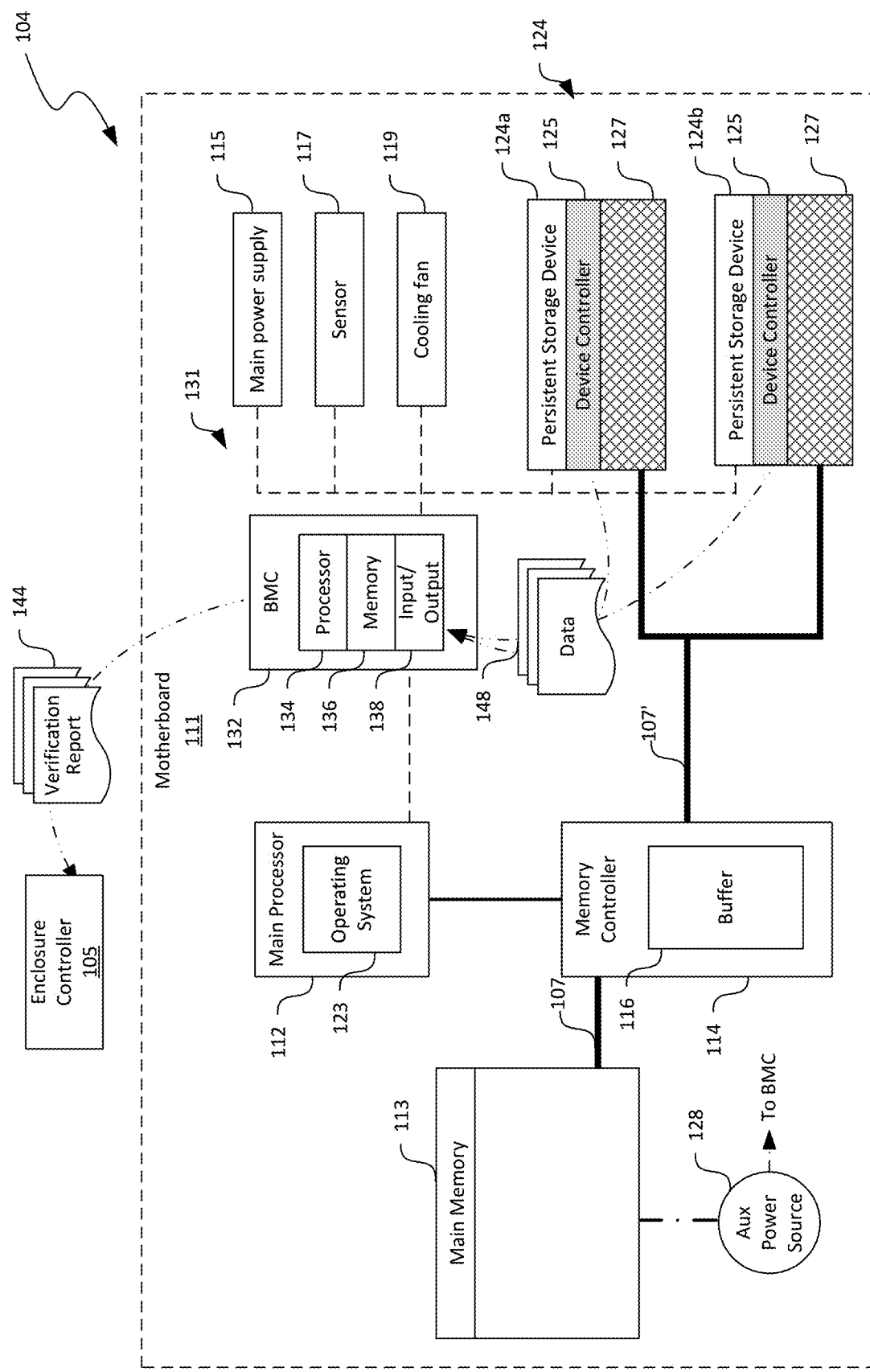

FIGS. 3A-3B are block diagrams illustrating certain hardware/software components of a computing unit 104 suitable for the computing system 100 of FIG. 1 during certain stages of data erasure verification in accordance with embodiments of the disclosed technology. Though FIGS. 3A-3B only show certain components of the computing unit 104, in other embodiments, the computing unit 104 can also include network interface modules, expansion slots, and/or other suitable mechanical/electrical components.

As shown in FIG. 3A, the computing unit 104 can include a motherboard 111 carrying a main processor 112, a main memory 113, a memory controller 114, one or more persistent storage devices 124 (shown as first and second persistent storage devices 124a and 124b, respectively), an auxiliary power source 128, and a BMC 132 operatively coupled to one another. The motherboard 111 can also carry a main power supply 115, a sensor 117 (e.g., a temperature or humidity sensor), and a cooling fan 119 (collectively referred to as "peripheral devices") coupled to the BMC 132.

Though FIGS. 3A-3B only show the motherboard 111 in phantom lines, the motherboard 111 can include a printed circuit board with one or more sockets configured to receive the foregoing or other suitable components described herein. In other embodiments, the motherboard 111 can also carry indicators (e.g., light emitting diodes), communication components (e.g., a network interface module), platform controller hubs, complex programmable logic devices, and/or other suitable mechanical and/or electric components in lieu of or in addition to the components shown in FIGS. 3A-3B. In further embodiments, the motherboard 111 can be configured as a computer assembly or subassembly having only portions of those components shown in FIGS. 3A-3B. For example, the motherboard 111 can form a computer assembly containing only the main processor 112, main memory 113, and the BMC 132 without the persistent storage devices 124 being received in corresponding sockets. In other embodiments, the motherboard 111 can also be configured as another computer assembly with only the BMC 132. In further embodiments, the motherboard 111 can be configured as other suitable types of computer assembly with suitable components.

The main processor 112 can be configured to execute instructions of one or more computer programs by performing arithmetic, logical, control, and/or input/output operations, for example, in response to a user request received from the client device 103 (FIG. 1). As shown in FIG. 3A, the main processor 112 can include an operating system 123 configured to facilitate execution of applications (not shown) in the computing unit 104. In other embodiments, the main processor 112 can also include one or more processor cache (e.g., L1 and L2 cache), a hypervisor, or other suitable hardware/software components.

The main memory 113 can include a digital storage circuit directly accessible by the main processor 112 via, for example, a data bus 107. In one embodiment, the data bus 107 can include an inter-integrated circuit bus or $I^2C$ bus as detailed by NXP Semiconductors N.V. of Eindhoven, the Netherlands. In other embodiments, the data bus 107 can also include a PCIE bus, system management bus, RS-232, small computer system interface bus, or other suitable types of control and/or communications bus. In certain embodiments, the main memory 113 can include one or more DRAM modules. In other embodiments, the main memory 113 can also include magnetic core memory or other suitable types of memory for holding data 118.

The persistent storage devices 124 can include one or more non-volatile memory devices operatively coupled to the memory controller 114 via another data bus 107' (e.g., a PCIE bus) for persistently holding data 118. For example, the persistent storage devices 124 can each include an SSD, HDD, or other suitable storage components. In the illustrated embodiment, the first and second persistent storage devices 124a and 124b are connected to the memory controller 114 via data bus 107' in parallel. In other embodiments, the persistent storage devices 124 can also be connected to the memory controller 112 in a daisy chain or in other suitable topologies. In the example shown in FIGS. 3A-3B, two persistent storage devices 124 are shown for illustration purposes only. In other examples, the computing unit 104 can include four, eight, sixteen, twenty four, forty eight, or any other suitable number of persistent storage devices 124.

Also shown in FIG. 3A, each of the persistent storage device 124 can include data blocks 127 containing data 118 and a device controller 125 configured to monitor and/or control operations of the persistent storage device 124. For example, in one embodiment, the device controller 125 can include a flash memory controller, a disk array controller (e.g., a redundant array of inexpensive disk or "RAID" controller), or other suitable types of controller. In other embodiments, a single device controller 125 can be configured to control operations of multiple persistent storage devices 124. As shown in FIG. 2A, the individual device controller 125 can be in communication with the BMC 132 via a management bus 131 (e.g., SMBus) to facilitate data erasure verification, as described in more detail below.

Also shown in FIG. 3A, the main processor 112 can be coupled to a memory controller 114 having a buffer 116. The memory controller 114 can include a digital circuit that is configured to monitor and manage operations of the main memory 113 and the persistent storage devices 124. For example, in one embodiment, the memory controller 114 can be configured to periodically refresh the main memory 113. In another example, the memory controller 114 can also continuously, periodically, or in other suitable manners read data 118 from the main memory 113 to the buffer 116 and transmit or "write" data 118 in the buffer 116 to the persistent storage devices 124. In the illustrated embodiment, the memory controller 114 is separate from the main processor 112. In other embodiments, the memory controller 114 can also include a digital circuit or chip integrated into a package containing the main processor 112. One example memory controller is the Intel® 5100 memory controller provided by the Intel Corporation of Santa Clara, Calif.

The BMC 132 can be configured to monitor operating conditions and control device operations of various components on the motherboard 111. As shown in FIG. 3A, the BMC 132 can include a BMC processor 134, a BMC memory 136, and an input/output component 138 operatively coupled to one another. The BMC processor 134 can include one or more microprocessors, field-programmable gate arrays, and/or other suitable logic devices. The BMC memory 136 can include volatile and/or nonvolatile computer readable media (e.g., ROM, RAM, magnetic disk storage media, optical storage media, flash memory devices, EEPROM, and/or other suitable non-transitory storage media) configured to store data received from, as well as instructions for, the processor 136. In one embodiment, both the data and instructions are stored in one computer readable medium. In other embodiments, the data may be stored in one medium (e.g., RAM), and the instructions may be stored in a different medium (e.g., EEPROM). As described in more detail below, in certain embodiments, the BMC memory 136 can contain instructions executable by the BMC processor 134 to perform data erasure verification in the computing unit 104. The input/output component 124 can include a digital and/or analog input/output interface configured to accept input from and/or provide output to other components of the BMC 132. One example BMC is the Pilot 3 controller provided by Avago Technologies of Irvine, Calif.

The auxiliary power source 128 can be configured to controllably provide an alternative power source (e.g., 12-volt DC) to the main processor 112, the memory controller 114, and other components of the computing unit 104 in lieu of the main power supply 115. In the illustrated embodiment, the auxiliary power source 128 includes a power supply that is separate from the main power supply 115. In other embodiments, the auxiliary power source 128 can also be an integral part of the main power supply 115. In further embodiments, the auxiliary power source 128 can include a capacitor sized to contain sufficient power to write all data from the portion 122 of the main memory 113 to the persistent storage devices 124. As shown in FIG. 2A, the BMC 132 can monitor and control operations of the auxiliary power source 128.

The peripheral devices can provide input to as well as receive instructions from the BMC 132 via the input/output component 138. For example, the main power supply 115 can provide power status, running time, wattage, and/or other suitable information to the BMC 132. In response, the BMC 132 can provide instructions to the main power supply 115 to power up, power down, reset, power cycle, refresh, and/or other suitable power operations. In another example, the cooling fan 119 can provide fan status to the BMC 132 and accept instructions to start, stop, speed up, slow down, and/or other suitable fan operations based on, for example, a temperature reading from the sensor 117. In further embodiments, the motherboard 111 may include additional and/or different peripheral devices.

FIG. 3A shows an operating stage in which the BMC 132 receives a verification command 142 from the enclosure controller 105 via, for example, the input/output component 138 and the management network 109 (FIG. 1). In response, the BMC 132 can be configured to identify a list of persistent storage devices 124 currently connected to the motherboard 111 by querying the device controllers 125 via, for instance, the management bus 131.

Once identified, the BMC 132 can be configured to determine one or more operating parameters for performing data erasure verification based on, for instance, one or more verification parameters included in the verification instruction 140 (FIG. 1) and/or the verification command 142. In one embodiments, the BMC 132 can determine one or more of the persistent storage devices 124 that are to be audited. In one example, all of the persistent storage devices 124 can be audited. In other examples, only a percentage of the persistent storage devices 124 (referred to as "audited device percentage") can be audited. Thus, a 50% audited device percentage would result in performing data erasure verification on one of the first or second persistent storage devices 124.

In certain embodiments, the BMC 132 can select the audited persistent storage devices 124 sequentially, randomly, or in other suitable orders. In another embodiment, the BMC 132 can select the audited persistent storage devices 124 based on a type of data (e.g., HBI, MBI, or LBI data) contained on the persistent storage devices 124. For instance, in the illustrated example in FIG. 3A, the BMC 132 can select the first persistent storage device 124a for containing HBI data instead of the second persistent storage device 124b for containing MBI or LBI data. In further embodiments, the BMC 132 can also select the audited persistent storage devices 124 based on other suitable parameters related to the persistent storage devices 124.

In another example, the BMC 132 can also determine a percentage of total capacity (referred to as "audited capacity percentage") on each audited persistent storage device 124 to perform data erasure verification. For instance, if a persistent storage device 124 has a total capacity of 100 gigabytes, a 50% audited capacity percentage would involve auditing 50 gigabytes on the persistent storage device 124. In a further example, the BMC 132 can also determine, for each audited portion of the persistent storage devices 124, a percentage of logic data blocks (referred to as "audited block percentage") is to be audited. Thus, in the example above, 80% audited block percentage of 50 gigabytes on the persistent storage devices 124 would be subject to data erasure verification. Based on the audited block percentage, the BMC 132 can determine which data blocks to audit randomly, to audit data blocks at beginning, middle, or end of the persistent storage devices 124, or select the data blocks in other suitable manners. Both the audited capacity percentage and the audited block percentage can be adjusted based on, for example, levels of business importance of data contained on the individual persistent storage devices 124 selected for performing an audit.

Once the BMC 132 determines the one or more persistent storage devices 124 to be audited and other associated operating parameters, the BMC 132 can issue a read command 146 via the input/output component 138 to one or more of the device controllers 125 corresponding to the persistent storage devices 124. In the illustrated embodiment, both the first and second persistent storage devices 124a and 124b are to be audited. As such, the BMC 132 transmits a read command 146 to both the first and second persistent storage devices 124a and 124b for retrieving data 146 from certain data blocks (e.g., boot sectors) for certain data sizes (e.g., 50 gigabytes), as shown in FIG. 3B.

In response to receiving the read command 146, the device controllers 125 can provide data 148 to the BMC 132 via the input/output component 138 if the persistent storage devices 124 can be read properly. If one of the persistent storage devices 124 cannot be read, the corresponding device controller 125 can provide a notification (not shown) regarding the read error to the BMC 132. Upon receiving the read data 148, the BMC 132 can be configured to perform various data verification operations to determine whether the read data 148 contains sensitive information. For example, in one embodiment, the BMC 132 can be configured to determine if the read data 148 contains a cryptographic key usable to decrypt data in the persistent storage device 124. If such a cryptographic key is found, the BMC 132 can indicate that data on the persistent storage device 124 is not erased properly. In another example, the BMC 132 can perform the foregoing determination based on a pattern (e.g., bit pattern, byte pattern, etc.) of the read data. If the pattern substantially matches a preset erasure pattern (e.g., all zeros or all ones), the BMC 132 can indicate that data has been erased properly from the persistent storage device 124. In further examples, the BMC 132 can apply other suitable data erasure verification techniques in addition to or in lieu of the foregoing techniques.

In certain implementations, the BMC 132 can issue read command 146 that cause the first and second persistent storage devices 124a and 124b to perform the same data erasure verification procedure, for example, based on the same audited capacity percentage and/or audited block percentage. In other implementations, the BMC 132 can be configured to determine a data erasure verification procedure corresponding to a level of business importance related to the data 118 currently residing in the persistent storage devices 124. For example, the first persistent storage device 124a can contain HBI data 118 while the second persistent storage device 124b can contain LBI data 118. As such, the BMC 132 can be configured to generate different read commands 146 to the first and second persistent storage devices 124 to read different data 146 from the corresponding persistent storage device 124. For instance, the BMC 132 can read a larger portion of the memory block 127 from the first persistent storage device 124a than from the second persistent storage device 124b. In other examples, the BMC 132 can also read more data blocks from the first persistent storage device 124a than from the second persistent storage device 124b.

As shown in FIG. 3B, once data erasure verification is completed, the BMC 132 can generate a verification report 144 and transmit the verification report 144 to the enclosure controller 105 via the management network 109 (FIG. 1). In certain embodiments, verification report 144 can include data indicating whether a verification process is successfully completed, and whether secure data erasure is properly performed on the audited persistent storage devices 124. In other embodiments, the verification report 144 can also indicate that a verification process on a particular persistent storage device 124 was not completed successfully due to read errors, communication errors, or other errors. In further embodiments, the verification report 144 can include a combination of the foregoing information and/or other suitable information related to the verification process. The enclosure controller 105 can then collect the verification report 144 from the individual BMCs 132 and provide an aggregated verification report 144' to the administrator 121 (FIG. 1) as described above with reference to FIG. 2B.

Even though the verification process is described above as using the BMC 132 in an out-of-band manner, in other embodiments, the same or similar verification process can also be implemented as a component of the operating system 123 or an independent application and performed using the main processor 112. For example, as described above with reference to FIG. 2E, the administrator 121 can issue a verification instruction 140 directly to a computing unit 104 via the data network 108. In response, the main processor 112 of the computing unit 104 can perform the data erasure verification process described above and report corresponding verification result 144 to the administrator via the data network 108.

Figure 4:
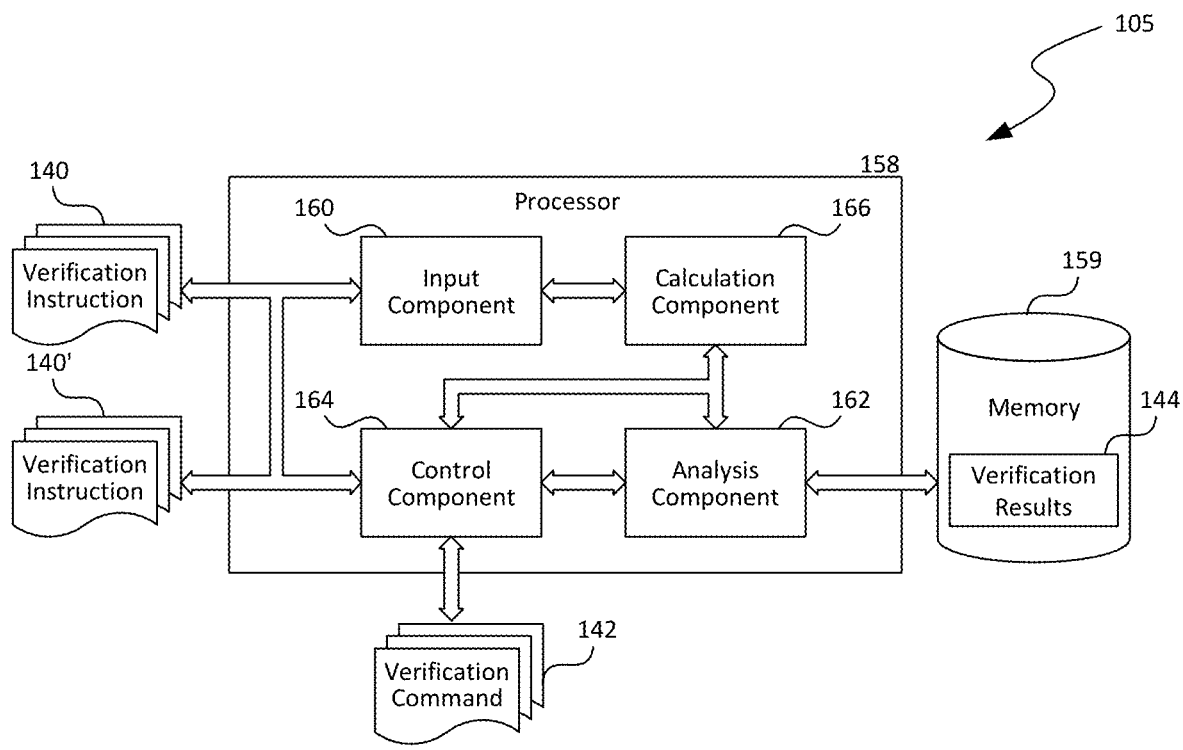
FIG. 4 is a block diagram of the enclosure controller suitable for the computing system in FIG. 1 in accordance with embodiments of the disclosed technology.

FIG. 4 is a block diagram of the enclosure controller 150 suitable for the computing system 100 in FIG. 1 in accordance with embodiments of the disclosed technology. In FIG. 4 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 4, the enclosure controller 105 can include a processor 158 operatively coupled to a memory 159. The processor 158 can include one or more microprocessors, field-programmable gate arrays, and/or other suitable logic devices. The memory 159 can include volatile and/or nonvolatile computer readable media (e.g., ROM, RAM, magnetic disk storage media, optical storage media, flash memory devices, EEPROM, and/or other suitable non-transitory storage media) configured to store data received from, as well as instructions for, the processor 158. For example, as shown in FIG. 4, the memory 159 can contain records of verification reports 144 received from, for example, one or more of the computing units 104 in FIG. 1.

The memory 159 can also contain instructions executable by the processor 158 to provide an input component 160, a calculation component 166, a control component 164, and an analysis component 162 interconnected with one another. The input component 160 can be configured to receive verification instruction 140 from the administrator 121 (FIG. 1) via the management network 109. The input component 160 can then provide the received verification instruction 140 to the analysis component 162 for further processing.

The calculation component 166 may include routines configured to perform various types of calculations to facilitate operation of other components of the enclosure controller 105. For example, the calculation component 166 can include routines for accumulating a count of errors detected during data erasure verification. In other examples, the calculation component 166 can include linear regression, polynomial regression, interpolation, extrapolation, and/or other suitable subroutines. In further examples, the calculation component 166 can also include counters, timers, and/or other suitable routines.

The analysis component 162 can be configured to analyze the received verification instruction 140 to determine to which computing units 104 and/or associated persistent storage devices 124 (FIG. 3A) to perform data erasure verification. In certain embodiments, the analysis component 162 can determine a list of computing units 104 based on one or more serial numbers, network identifications, or other suitable identification information associated with one or more persistent storage devices 124 and/or computing units 104. In other embodiments, the analysis component 162 can make the determination based on a remaining useful life, a percentage of remaining useful life, or other suitable information and/or criteria associated with the one or more persistent storage devices 124.

The control component 164 can be configured to control performance of data erasure verification in the computing units 104. In certain embodiments, the control component 164 can issue verification command 142 to a device controller 125 (FIG. 3A) of the individual persistent storage devices 124. In other embodiments, the control component 164 can also cause the received verification instruction 140' be relayed to other enclosure controllers 105. Additional functions of the various components of the enclosure controller 105 are described in more detail below with reference to FIG. 6.

Figure 5:
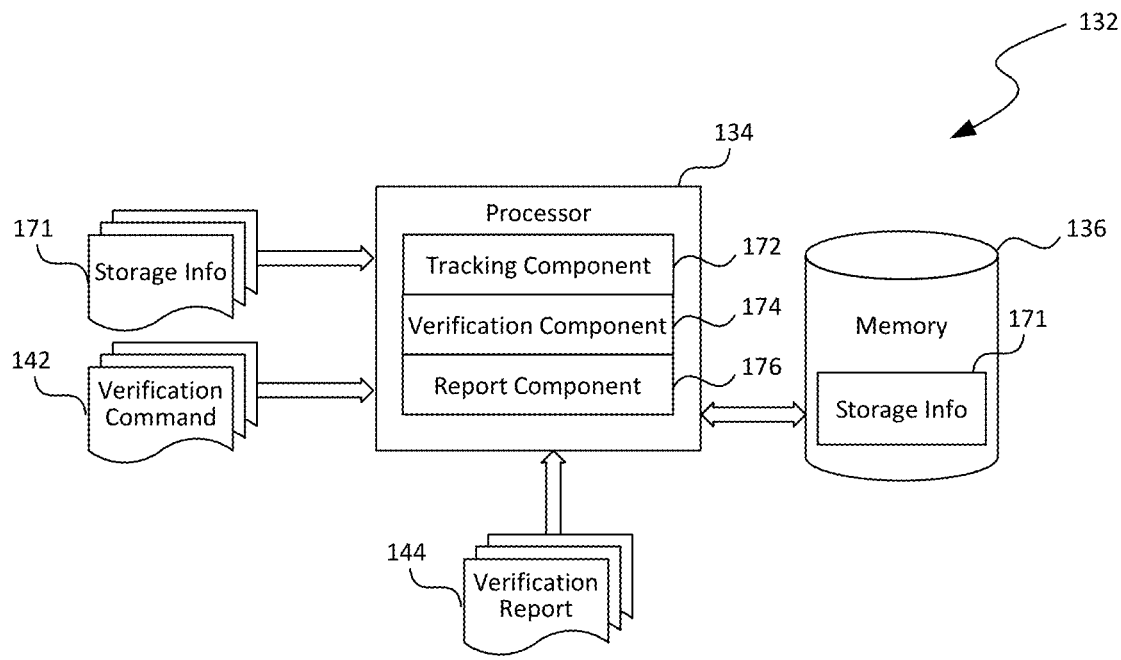
FIG. 5 is a block diagram of a baseboard management controller suitable for the computing unit in FIG. 1 in accordance with embodiments of the disclosed technology.

FIG. 5 is a block diagram of a BMC 132 suitable for the computing unit 104 in FIG. 1 in accordance with embodiments of the disclosed technology. As shown in FIG. 5, the BMC processor 134 can execute instructions in the BMC memory 136 to provide a tracking component 172, a verification component 174, and a report component 176. The tracking component 172 can be configured to track one or more persistent storage devices 124 (FIG. 3A) connected to the motherboard 111 (FIG. 3A). In the illustrated embodiment, the persistent storage devices 124 can provide storage device information 171 to the BMC 132 on a periodic or other suitable basis. In other embodiments, the tracking component 172 can query or scan the motherboard 111 for existing, new, or removed persistent storage devices 124. The tracking component 172 can then store the received storage information in the BMC memory 136 (or other suitable storage locations).

The verification component 174 can be configured to facilitate performance of data erasure verification on a persistent storage device 124 upon receiving a verification command 142 from, for example, the enclosure controller 105 (FIG. 1) or directly from the administrator 121 (FIG. 1). In certain embodiments, the verification component 174 can be configured to initiate a data erasure verification operation, monitor progress of the initiated operation, and indicate to the report component 176 at least one of a failure, successful completion, or no response. In turn, the report component 176 can be configured to generate the verification report 144 and provide the generated verification report 144 to the enclosure controller 105 or to the administrator 121 directly. Additional operations performed by the foregoing components are described in more detail below with reference to FIGS. 6 and 7.

Figure 6:
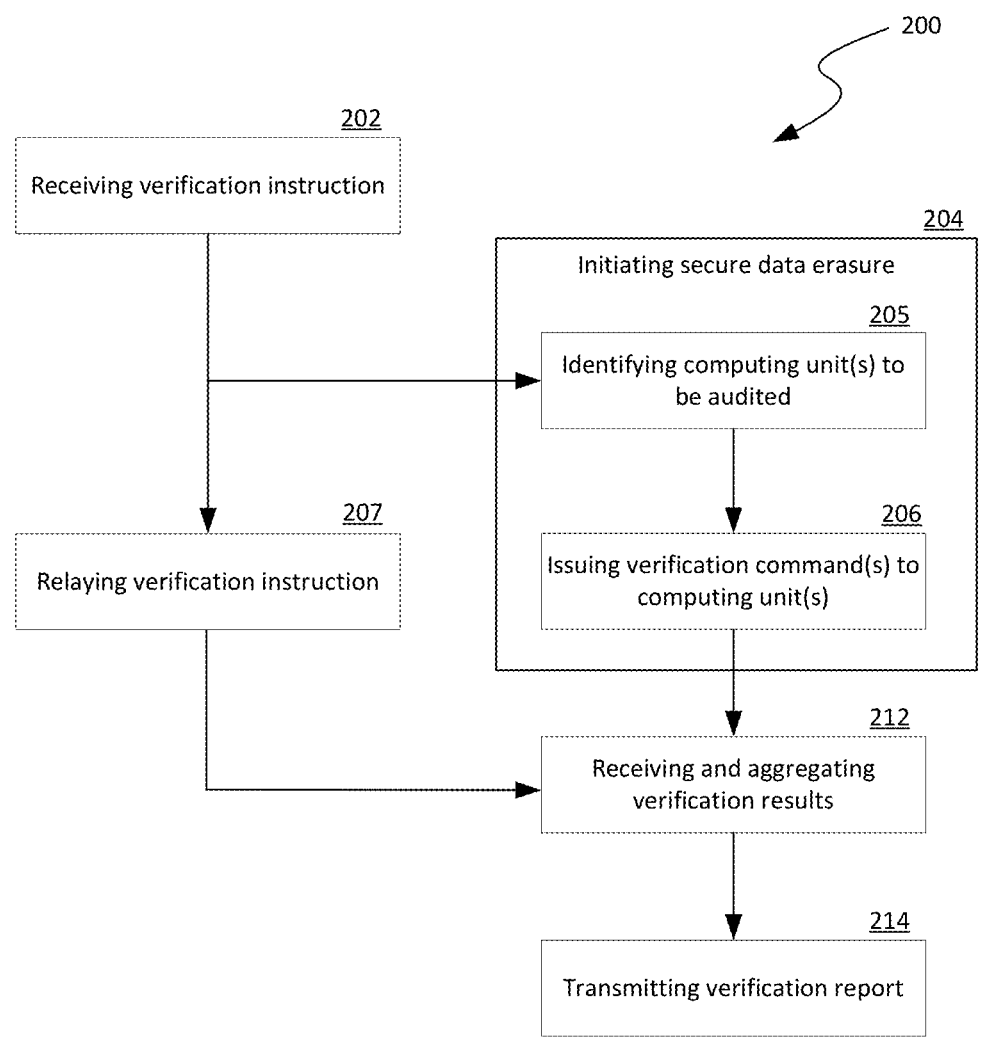
FIGS. 6-8 are flowcharts illustrating processes of performing secure data erasure in a computing system in accordance with embodiments of the disclosed technology.

FIG. 6 is a flowchart illustrating a process 200 of performing data erasure verification in a computing system in accordance with embodiments of the disclosed technology. Even though the process 200 is described in relation to or in the context of the computing system 100 of FIG. 1 and the hardware/software components of FIGS. 2A-3B, in other embodiments, the process 200 can also be implemented in other suitable systems.

As shown in FIG. 6, the process 200 can include receiving a data erasure verification instruction via a management network or a data network at stage 202. The process 200 can then include initiating data erasure verification in the current enclosure at stage 204 and concurrently proceeds to relaying the received verification instruction to additional enclosure controllers at stage 207. As shown in FIG. 6, initiating data erasure verification in the current enclosure can include identifying one or more computing units whose connected persistent storage devices are to be verified at stage 205. In one embodiment, the one or more computing units can be identified randomly, sequentially, or in other suitable manners based on an audited device percentage. In other embodiments, the one or more computing units can be identified based on levels of business importance of data contained in respective persistent storage devices. In further embodiments, the one or more computing units can be identified based on administrator designation or in other suitable manners. The process 200 can then proceed to issuing verification commands to the one or more identified computing units at stage 206 and receiving verification results from the computing units at stage 212. The process 200 can then include aggregating the received verification results to generate an erasure report and transmitting the erasure report to, for example, an administrator via the management network or the data network.

Figure 7:
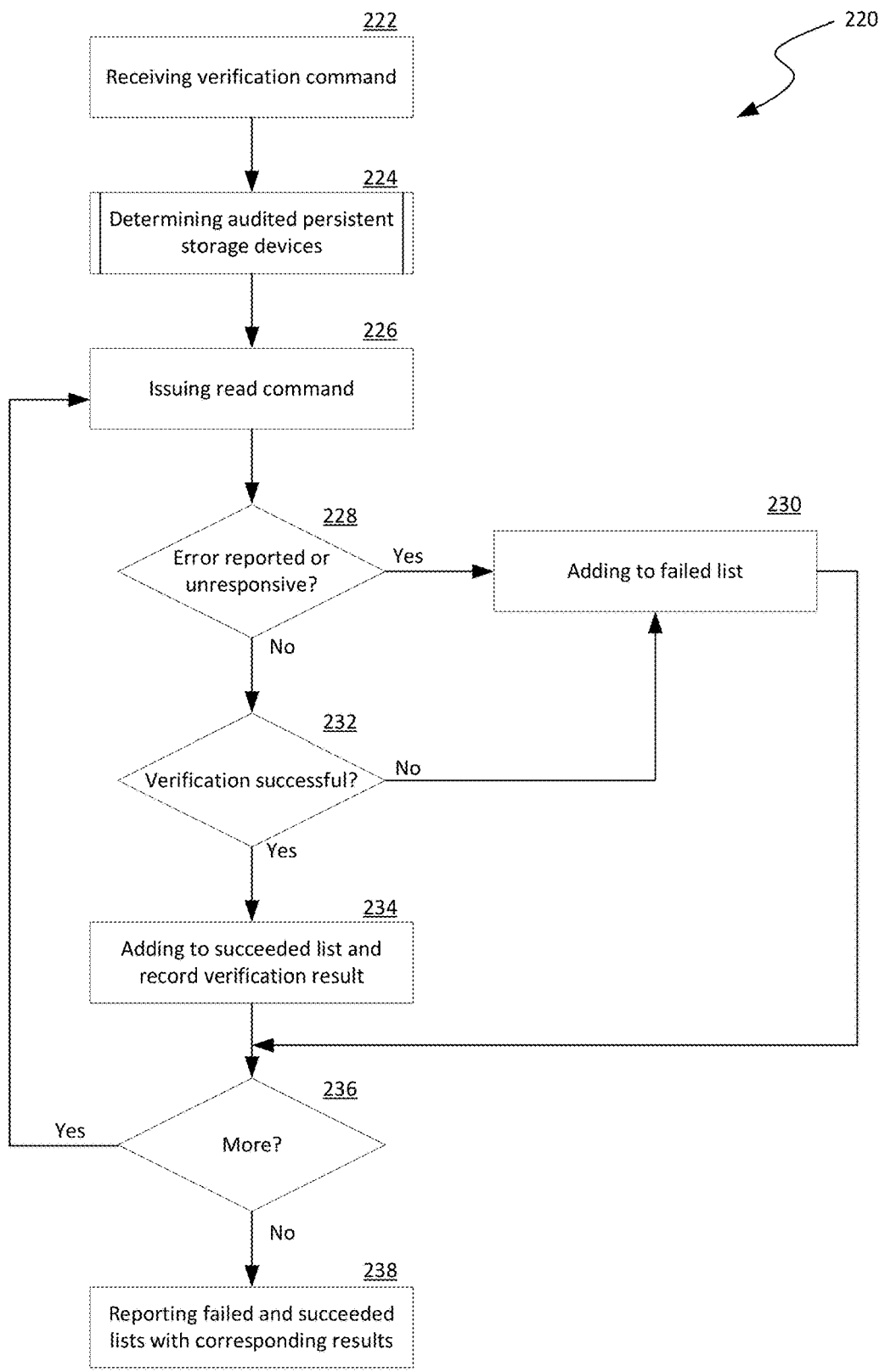

FIG. 7 is a flowchart illustrating a process 220 of performing data erasure verification in a computing system in accordance with embodiments of the disclosed technology. As shown in FIG. 7, the process 220 can include receiving a verification command from, for example, an enclosure controller 105 in FIG. 1, at stage 222. The process 220 can then include determining a list of persistent storage devices for performing data erasure verification and associated verification parameters based on an audited device percentage, an audited capacity percentage, and/or an audited block percentage at stage 224. Example operations of determining associated verification parameters are described in more detail below with reference to FIG. 8. For one of the identified persistent storage devices, the process 220 can then include issuing a verification command to verify that data from the persistent storage device has been securely erased at stage 226.

The process 220 can then include a decision stage 228 to determine whether the persistent storage device reports data verification error (e.g., data read error, etc.) or the persistent storage device is non-responsive to the verification command. In response to determining that an error is reported or the persistent storage device is non-responsive, the process 220 proceeds to adding the persistent storage device to a failed list at stage 230. Otherwise, the process 220 proceeds to another decision stage 232 to determine whether the data erasure verification is completed successfully. In response to determining that the data erasure verification is not completed successfully, the process 220 reverts to adding the persistent storage device to the failed list at stage 230. Otherwise, the process 220 proceeds to adding the persistent storage device to a succeeded list and record corresponding verification results at stage 234. The process 220 can the include a further decision stage 236 to determine whether read commands need to be issued to additional persistent storage devices. In response to determining that read commands need to be issued to additional persistent storage devices, the process 220 can revert to issuing another verification command to another persistent storage device at stage 226. Otherwise, the process 220 can proceed to generate and transmitting a verification report containing data of the failed and succeeded lists with corresponding verification results at stage 238.

Figure 8:
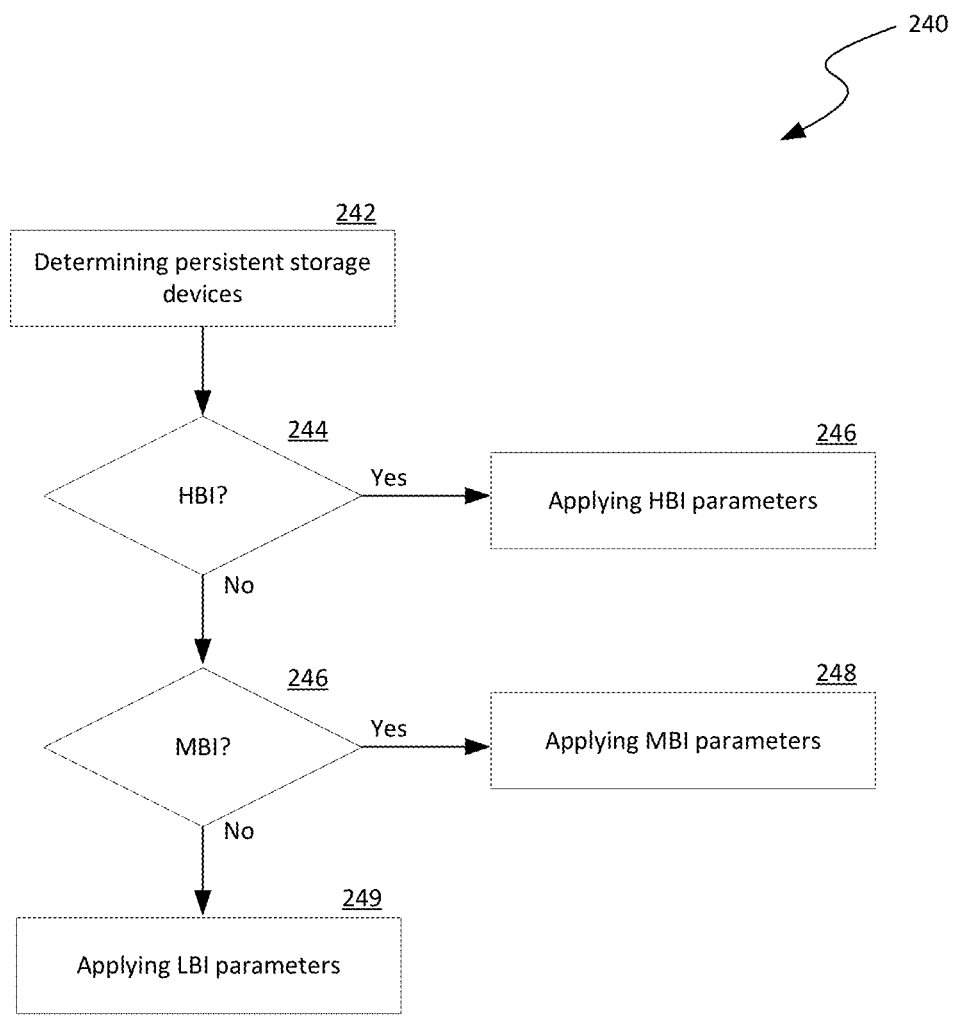

FIG. 8 is a flowchart illustrating example operations 240 for determining verification parameters for auditing a persistent storage device in accordance with embodiments of the disclosed technology. As shown in FIG. 8, the operations 240 can include determining a list of persistent storage devices that are connected to, for example, a BMC 132 (FIG. 3A). The operations 240 can then include a decision stage 244 to determine whether the persistent storage device is classified as containing HBI data. In response to determining that the persistent storage device is classified as containing HBI data, the operations 240 can include applying HBI parameters for performing data erasure verification on the persistent storage device at stage 246. In certain embodiments, the HBI parameters can include a set of values related to an audited device percentage, an audited capacity percentage, and an audited block percentage. In other embodi-
ments, the HBI parameters can include a verification method or other verification parameters in addition to or in lieu of the foregoing parameters.

In response to determining that the persistent storage device is not classified as containing HBI data, the operations 240 can include another decision stage 246 to determine whether the persistent storage device is classified as containing MBI data. In response to determining that the persistent storage device is classified as containing MBI data, the operations 240 can include applying MBI parameters for performing data erasure verification on the persistent storage device at stage 248. In response to determining that the persistent storage device is not classified as containing MBI data, the operations 240 can include applying LBI parameters for performing data erasure verification on the persistent storage device at stage 249.

The HBI, MBI, and LBI parameters can include different values for the same verification parameters. For example, each of the HBI, MBI, and LBI parameters can include the following example values for the audited device percentage, audited capacity percentage, and audited block percentage:

75%, 75%, 50%
50%, 50%, 25%
25%, 25%, 10%

In other examples, the foregoing values can be adjusted based on previous verification results, time constraints, resource constraints, or other suitable factors. Even though HBI, MBI, and LBI are used above as example classifications for the persistent storage device, in other embodiments, other classification schemes can also be applied. For example, the persistent storage device can be classified as either high or low business importance. In another example, the persistent storage device can also be classified based on years of service, capacity, or other suitable criteria.

Figure 9:
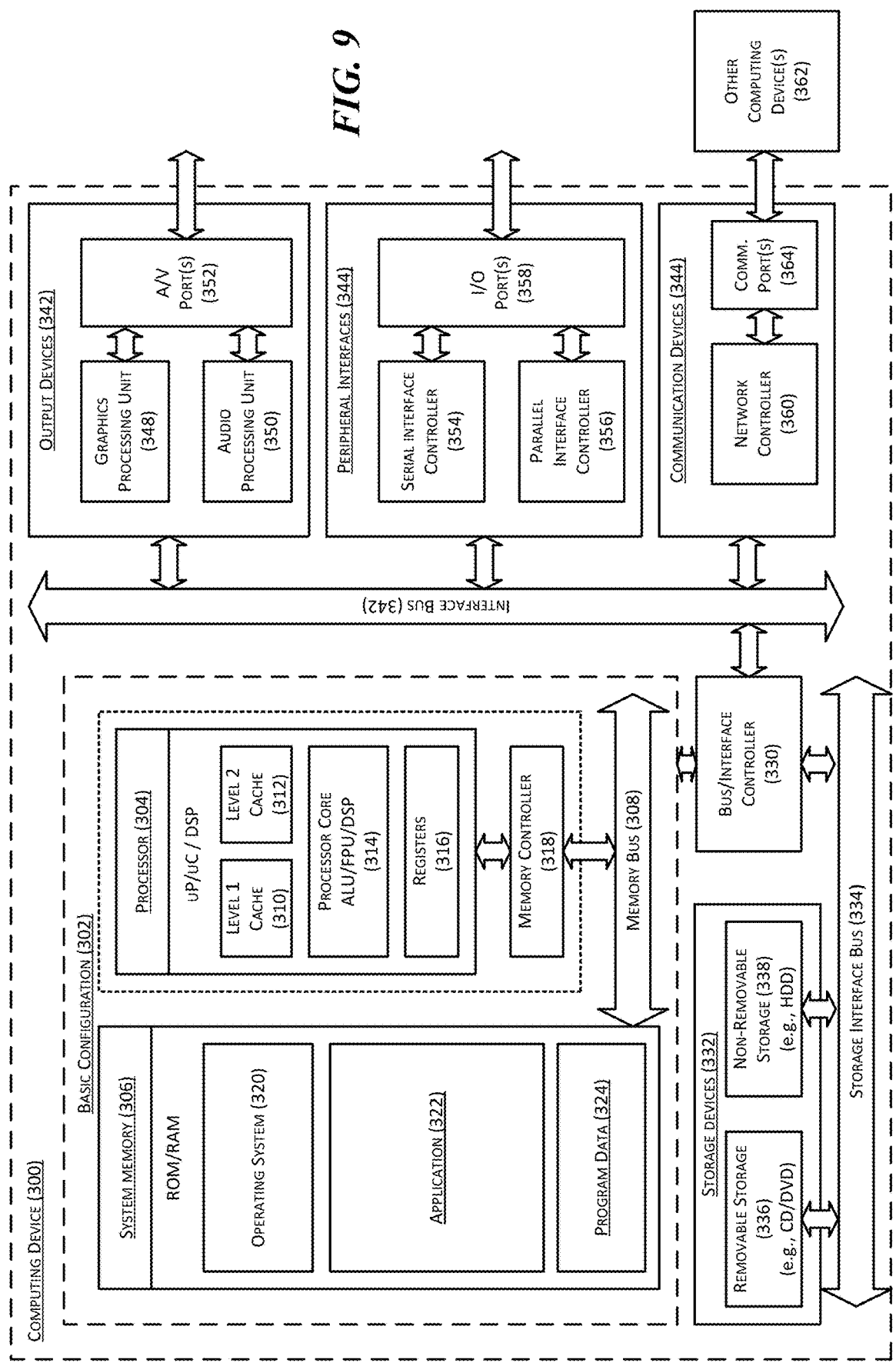
FIG. 9 is a computing device suitable for certain components of the computing system in FIG. 1.

FIG. 9 is a computing device 300 suitable for certain components of the computing system 100 in FIG. 1. For example, the computing device 300 can be suitable for the computing units 104, the client devices 103, the management station 103', or the enclosure controllers 105 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 9, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed by a computing device in a computing system having a plurality of servers housed in an enclosure, the computing device including a main processor and a main memory containing instructions executable by the main processor to provide data of a computing service to a client device via a data network, a baseboard management controller ("BMC") having a processor, a plurality of persistent storage devices operatively coupled to both the BMC via a management bus and to the main processor via a data bus separate from the management bus, a motherboard carrying the main processor, main memory, BMC, and the plurality of storage devices, wherein the method comprising:

receiving, at the BMC of the computing device, a data erasure verification instruction from a system administrator via a management network in the computing system, the management network being configured to control device operations of the computing device independent of execution of any firmware or operating system by the main processor of the computing device; and with the processor of the BMC on the computing device,
identifying one or more of the plurality of persistent storage devices to which the data erasure verification is to be performed;

determining a percentage of logic data blocks or total capacity of the one or more of the plurality of persistent storage devices to perform the data erasure verification on based on an importance level of data previously residing on the one or more of the plurality of persistent storage devices; and transmitting a verification command to the one or more of the plurality of persistent storage devices via a network interface between the BMC and the plurality of persistent storage devices, the verification command instructing the one or more of the plurality of persistent storage devices to provide at least a portion of data currently residing in the percentage of logic data blocks or total capacity on the one or more of the plurality of persistent storage devices to the BMC to perform the data erasure verification, and verifying, without manual intervention, that the provided at least portion of the data currently residing on the one or more of the plurality of persistent storage devices does not contain data of business importance.

2. The method of claim 1 wherein receiving the data erasure verification instruction includes receiving the data erasure verification instruction identifying a percentage of the plurality of persistent storage devices to be verified.

3. The method of claim 1, further comprising:
transmitting, from the computing device, a verification report indicating an error, a failure, or a successful completion related to the data erasure verification performed on the computing device.

4. The method of claim 1 wherein:
the computing device is a first computing device;
the enclosure is a first enclosure;
the computing system also includes a second enclosure housing a second computing device; and
the method further includes relaying, from the first computing device, the received data erasure verification instruction to the second computing device to perform the data erasure verification on the second computing device in the second enclosure generally in parallel to performing the data erasure verification on the first computing device in the first enclosure.

5. The method of claim 4, further comprising:
receiving, from the second computing device, an erasure report indicating an error, a failure, or a successful completion related to the data erasure verification performed on the second computing device in the second enclosure;
generating an aggregated erasure report based on the erasure report received from the second computing device; and
transmitting the aggregated erasure report to the system administrator via the management network or a data network.

6. The method of claim 5 wherein:
the computing system also includes a third enclosure housing a third computing device; and
the method further includes relaying, from the second computing device, the data erasure verification instruction to the third computing device to perform the data erasure verification on the third computing device in the third enclosure generally in parallel to performing the data erasure verification on the first and second computing devices in the first and second enclosures.

7. The method of claim 5 wherein:
the computing system also includes a third enclosure housing a third computing device; and
the method further includes relaying, from the first computing device, the data erasure verification instruction to both the second and third computing devices to perform the data erasure verification on the second and third computing devices in the second and third enclosures, respectively, generally in parallel to performing the data erasure verification on the first computing device in the first enclosure.

8. A computing device, comprising:
a main processor and a main memory operatively coupled to one another, the main memory contains instructions executable by the main processor to provide data of a computing service to a client device via a data network;
a baseboard management controller ("BMC");
a plurality of persistent storage devices operatively coupled to both the BMC via a management bus and to the main processor via a data bus separate from the management bus, the plurality of persistent storage devices individually containing data received from the main processor; and
a motherboard carrying the main processor, main memory, BMC, and the plurality of persistent storage devices, wherein the BMC includes a processor and a memory containing instructions executable by the processor to cause the BMC to:
receive, via a management network independent from the data network, a verification command to verify that data has been securely erased from the persistent storage device; and
in response to the received verification command, independent of operations by the main processor,
identify one or more of the plurality of persistent storage devices to which the data erasure verification is to be performed;
determining a percentage of logic data blocks or total capacity of the one or more of the plurality of persistent storage devices to perform the data erasure verification on based on an importance level of data previously residing on the one or more of the plurality of persistent storage devices;
transmit a read command to the identified one or more of the plurality of persistent storage devices via a management interface between the BMC and the one or more of the plurality of persistent storage devices on the management bus, the read command instructing the one or more of the plurality of persistent storage devices to provide at least a portion of data currently residing in the percentage of logic data blocks or total capacity on the one or more of the plurality of persistent storage devices to the BMC; and
verify, at the BMC, that the provided at least portion of the data currently residing on the one or more of the plurality of persistent storage devices does not contain data of business importance, thereby effecting the data erasure verification on the one or more of the plurality of persistent storage devices via the management network independent of the data network.

9. The computing device of claim 8 wherein:
each of the one or more of the plurality of persistent storage devices includes a device controller and a memory block containing data; and
transmitting the read command to the one or more of the plurality of persistent storage devices includes transmitting the read command to the respective device controllers of the one or more of the plurality of persistent storage devices, the read command instructing each respective device controller to provide a part of the data at a beginning portion in the respective memory block.

10. The computing device of claim 8 wherein:
each of the one or more of the plurality of persistent storage devices includes a device controller and a memory block containing data; and
transmitting the read command to the one or more of the plurality of persistent storage devices includes transmitting the read command to the respective device controllers of the one or more of the plurality of persistent storage devices, the read command instructing each respective device controller to provide a part of the data in the respective memory block randomly.

11. The computing device of claim 8 wherein:
receiving the data erasure verification command includes receiving the data erasure verification command from an enclosure controller via the management network;

each of the one or more of the plurality of persistent storage devices includes a device controller and a memory block containing data; and transmitting the read command to the one or more of the plurality of persistent storage devices includes transmitting the read command to the respective device controllers of the one or more of the plurality of persistent storage devices, the read command instructing each respective device controller to provide all of the data in the respective memory block.

12. The computing device of claim 8 wherein:

each of the one or more of the plurality of persistent storage devices includes a device controller and a memory block containing data;

transmitting the read command to the one or more of the plurality of persistent storage devices includes transmitting the read command to the respective device controller of the one or more of the plurality of persistent storage devices, the read command instructing each respective device controller to provide a part of the data from a location in the respective memory block, the part of the data having a size specified by the read command.

13. The computing device of claim 12, further comprising determining whether the data erasure verification is completed successfully based on the data read from the one or more of the plurality of persistent storage devices and in response to determining that the data erasure verification is completed successfully in the one or more of the plurality of persistent storage devices, adding the one or more of the plurality of persistent storage devices to a success list of persistent storage devices and record corresponding verification results.

14. The computing device of claim 12, further comprising determining whether the data erasure verification is completed successfully based on the data read from the one or more of the plurality of persistent storage devices and in response to determining that the data erasure verification is not completed successfully in the one or more of the plurality of persistent storage devices, adding the one or more of the plurality of persistent storage devices to a failed list of persistent storage devices.

15. The computing device of claim 8 wherein verifying that the provided at least portion of the data currently residing on the one or more of the plurality of persistent storage devices does not contain data of business importance includes:

determining whether the provided at least portion of the data currently residing on the one or more of the plurality of persistent storage devices matches a predetermined data pattern; and in response to determining that the provided at least portion of the data currently residing on the one or more of the plurality of persistent storage devices matches the predetermined data pattern, indicating that the provided at least portion of the data from the one or more of the plurality of persistent storage devices does not contain data of business importance.

16. The computing device of claim 8 wherein verifying that the provided at least portion of the data currently residing on the one or more of the plurality of persistent storage devices does not contain data of business importance includes:

determining whether the provided at least portion of the data currently residing on the one or more of the plurality of persistent storage devices matches a predetermined data pattern; and in response to determining that the provided at least portion of the data currently residing on the one or more of the plurality of persistent storage devices does not match the predetermined data pattern, indicating that the provided at least portion of the data from the one or more of the plurality of persistent storage devices contains data of business importance.

17. The computing device of claim 8 wherein:

each of the one or more of the plurality of persistent storage devices includes a device controller and a memory block containing data; and the process performed by the processor further includes determining a level of business importance of the data on the one or more of the plurality of persistent storage devices.

18. A baseboard management controller ("BMC") in a computing device having a main processor and a main memory having instructions executable by the main processor to provide data of a computing service to a client device via a data network, a plurality of persistent storage devices operatively coupled to both the BMC via a management bus and to the main processor via a data bus separate from the management bus, and a motherboard carrying the main processor, main memory, BMC, and the plurality of persistent storage devices, wherein the BMC includes a processor and a memory containing instructions executable by the processor to cause the BMC to:

receive, via a management network independent from the data network, a data erasure verification command to verify that data has been securely erased from the plurality of persistent storage devices; and in response to the received verification command, independent of operations by the main processor, identify one or more of the plurality of persistent storage devices to which the data erasure verification is to be performed;

determining a percentage of logic data blocks or total capacity of the one or more of the plurality of storage devices to perform the data erasure verification on based on an importance level of data previously residing on the one or more of the plurality of persistent storage devices;

transmit a read command to the identified one or more of the plurality of persistent storage devices via a management interface between the BMC and the one or more of the plurality of persistent storage devices on the management bus, the read command instructing the one or more of the plurality of persistent storage devices to provide at least a portion of data currently residing in the percentage of logic data blocks or total capacity on the one or more of the plurality of persistent storage devices to the BMC; and verify, at the BMC, that the provided at least portion of the data currently residing on the one or more of the plurality of persistent storage devices does not contain data of business importance, thereby effecting the data erasure verification on the one or more of the plurality of persistent storage devices via the management network independent of the data network.

19. The BMC of claim 18 wherein:

each of the one or more of the plurality of persistent storage devices includes a device controller and a memory block containing data; and to transmit the read command to the one or more of the plurality of persistent storage devices includes to transmit the read command to the respective device controllers of the one of the plurality of persistent storage devices, the read command instructing each respective device controller to provide a part of the data at a beginning portion in the respective memory block.

20. The BMC of claim 18 wherein:

the one of the plurality of persistent storage devices includes a device controller and a memory block containing data; and to transmit the read command to the one of the plurality of persistent storage devices includes to transmit the read command to the respective device controllers of the one of the plurality of persistent storage devices, the read command instructing each respective device controller to provide a part of the data in the respective memory block randomly.

* * * * *